United States Patent
Chernow et al.

[15] 3,655,959

[45] Apr. 11, 1972

[54] MAGNETIC MEMORY ELEMENT TESTING SYSTEM AND METHOD

[72] Inventors: Gary Allen Chernow, Swarthmore, Pa.; Hyman Gail, Cherry Hill, N.J.

[73] Assignee: Computer Test Corporation

[22] Filed: Aug. 17, 1970

[21] Appl. No.: 64,158

[52] U.S. Cl. ..........................235/153, 324/34 R, 324/73 R, 340/174 TC

[51] Int. Cl. ..........................G11c 29/00

[58] Field of Search ..............235/153; 340/174 ED, 174 TC, 340/172.5; 324/73 R, 34 R

[56] References Cited

UNITED STATES PATENTS

| | | | |
|---|---|---|---|
| 3,440,526 | 4/1969 | Kastning | 324/34 |
| 3,443,210 | 5/1969 | Kastning | 324/34 |
| 3,478,286 | 11/1969 | Dervan | 235/153 |
| 3,518,413 | 6/1970 | Holtey | 235/153 |
| 3,519,808 | 7/1970 | Lawder | 235/153 |
| 3,541,441 | 11/1970 | Hrustich | 324/73 |

*Primary Examiner*—Charles E. Atkinson
*Attorney*—Maleson, Kimmelman and Ratner and Allan Ratner

[57] ABSTRACT

A method and system for testing a magnetic memory element by applying a sequence of test routines in which each test routine is a programmed sequence to tests and analyses; each routine having programmed segments and each segment having programmed steps. A programmed test control provides test parameter and step selection control signals. A programmed timing control selects steps to be performed in response to the step selection signals and generates timing signals as programmed in each of the selected steps. A test pulse generator produces test signals in response to the test parameter control signals and the timing signals.

45 Claims, 24 Drawing Figures

INVENTORS
GARY A. CHERNOW
HYMAN GAIL
BY
Maleson, Kimmelman & Ratner
ATTORNEYS

INVENTORS
GARY A. CHERNOW
HYMAN GAIL
BY Maleson, Kimmelman & Ratner
ATTORNEYS

INVENTORS
GARY A. CHERNOW
HYMAN GAIL
BY
Maleson, Kimmelman & Ratner
ATTORNEYS

INVENTORS
GARY A. CHERNOW
HYMAN GAIL
BY
Maleson, Kimmelman & Ratner
ATTORNEYS

INVENTORS
GARY A. CHERNOW
HYMAN GAIL
BY
Maleson, Kimmelman & Ratner
ATTORNEYS

INVENTORS
GARY A. CHERNOW
HYMAN GAIL
BY
Maleson, Kimmelman & Ratner
ATTORNEYS

INVENTORS
GARY A. CHERNOW
HYMAN GAIL
BY
Maleson, Kimmelman & Ratner
ATTORNEYS

INVENTORS
GARY A. CHERNOW
HYMAN GAIL
BY Maleson, Kimmelman & Ratner
ATTORNEYS

INVENTORS
GARY A. CHERNOW
HYMAN GAIL
BY
Maleson, Kimmelman & Ratner

ATTORNEYS

INVENTORS
GARY A. CHERNOW
HYMAN GAIL
BY
Maleson, Kimmelman & Ratner
ATTORNEYS

INVENTORS
GARY A. CHERNOW
HYMAN GAIL
BY
Maleson, Kimmelman & Ratner
ATTORNEYS

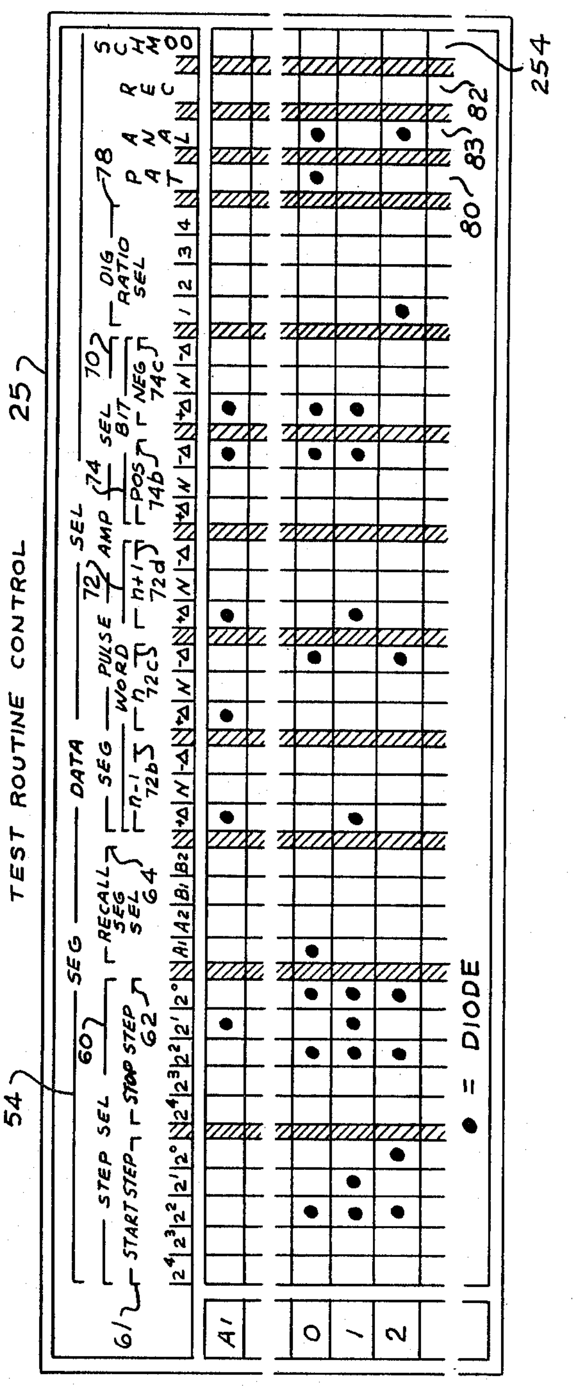
FIG. 7B
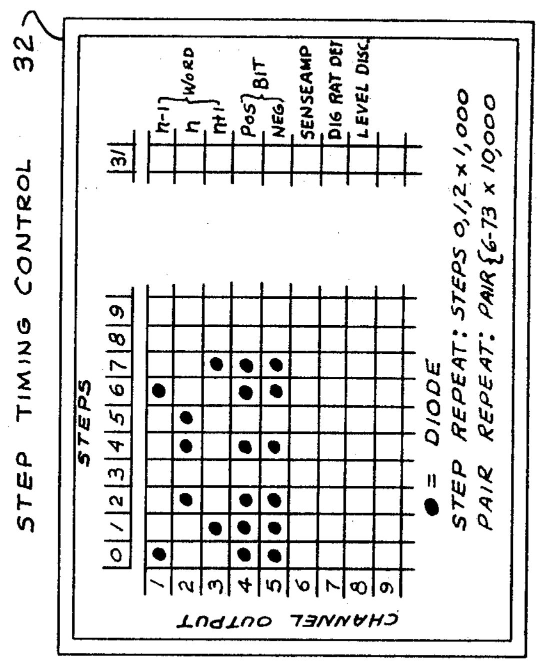
FIG. 7C
| PROG OPER NO. | OPERATION | NO. OF EVENTS |
|---|---|---|
| 1 | PRECON n-1 | 1,000 |
| 2 | PRECON n+1 | 1,000 |
| 3 | PRECON n | 1,000 |
| 4 | WRITE DATA | 1 |
| 5 | PREREAD | 1 |
| 6, 7 | ADJACENT CELL DISTURB (PAIRSTEP RPT) | 10,000 |
| 8 | POSTREAD | 1 |
FIG. 7A
INVENTORS
GARY A. CHERNOW
HYMAN GAIL
BY
Maleson, Kimmelman & Ratner
ATTORNEYS INVENTORS
GARY A. CHERNOW
HYMAN GAIL
BY
Maleson, Kimmelman & Ratner
ATTORNEYS

INVENTORS
GARY A. CHERNOW
HYMAN GAIL

BY
Maleson, Kimmelman & Ratner

ATTORNEYS

INVENTORS
GARY A. CHERNOW
HYMAN GAIL
BY
Maleson, Kimmelman & Ratner
ATTORNEYS

MAGNETIC MEMORY ELEMENT TESTING SYSTEM AND METHOD

TABLE OF CONTENTS

| | Column |
|---|---|
| 1. Background of the Invention | 1 |
| A. Field of the Invention | 1 |
| B. Prior Art | 1 |
| 2. Summary of the Invention | 2 |
| 3. Brief Description of the Drawings | 2 |
| 4. Theory of Test of Memory Element | 3 |
| 5. General Description of System **12** | 5 |
| 6. Detailed Description of System **12** | 6 |
| A. Test Routine Control **25** | 6 |
| B. Step Timing Control **32** | 8 |
| C. Test Pulse Generator **40** | 9 |
| 1. Word Pulse Generation | 10 |
| 2. Bit Pulse Generation | 11 |
| D. Test Station **15** | 13 |
| E. Response Analysis System **45** | 14 |
| 1. Level Discriminator **215** | 14 |
| 2. Digital Ratio Detector **224** | 14 |
| F. Schmoo Operation | 16 |
| G. Programmed Test Routine Operation | 18 |

1. BACKGROUND OF THE INVENTION

A. Field of the Invention

This invention relates to the field of art of magnetic memory element testing systems.

B. Prior Art

Magnetic memory elements of the plated wire type are known in which, for example, a strand of beryllium-cobalt alloy wire is plated with a continuous coating of a nickel-iron alloy. As described in detail in an article by Mathias and Fedde, Plated-Wire Technology: A Critical Review, IEEE Transactions on Magnetics, Vol. Mag.-5, No. 4, December 1969, Pages 728 – 751, a preferred magnetization direction may be formed circumferentially around the wire and a single memory region to be used for storing one bit may be about 15 mils in length on the plated wire element. Several hundred of such bits can conveniently be stored on each plated wire element making up a total memory. Bit positions are determined by the position of word lines or straps. The straps are formed perpendicular to and insulated from the plated wire element with each strap forming a solenoid around all of the parallel plated wire elements.

In operation of the plated wire memory element, information is stored according to the sense of the circumferential magnetization within a particular bit region. For example, clockwise magnetization may represent a stored one and counter clockwise magnetization may represent a stored zero.

In order to read the information stored, a word current is applied to the word strap which produces a word field along the axis of the elements. The word field tilts the magnetization vector from its circumferential rest position towards the axis of the wire. The resultant magnetic flux change produces a voltage at the ends of the plated wire element. If the amplitude of the word current is controlled so that the magnetization returns to its initial position when the current is turned off, nondestructive readout is achieved. Information may be stored in the element by coincidence of a word current pulse and a bit current pulse which is applied through the plated wire element. When the bit current is of a first polarity, the magnetization vector is steered so that at the termination of both current pulses the vector is in a defined logic 1 rest position. When the bit current is of the opposite polarity, the vector is in the logic 0 rest position.

It has been recognized that continuous electrical testing of plated wire elements immediately following the plating operation and before the wire is cut is instrumental in achieving maximum production yield. The two principle objectives of such "on-line" testing are (1) proper operation in a desired memory system configuration and (2) control of the manufacturing process. The testing should accurately predict the performance of the plated wire in any one of a range of system operating conditions in which the plated wire element may be used. In addition, "off-line" testing may also be provided to achieve detailed analysis of a plated wire element. It has been found that the most effective test procedure requires the element to be tested under conditions which closely resemble the anticipated system environment.

An optimum test routine for a plated wire element may first provide logical operations for extensive exercising of the element in a predetermined manner. This is applicable to both on-line and off-line tests. A further test requirement for on-line tests is that the operations be on a time scale consistant with the speed of the plating process in real time. Otherwise, less than 100 percent test coverage of the plated wire element is provided. Such 100 percent coverage is essential since it is generally not known during tests which exact regions of the element will be used for information storage since these regions are a function of the total memory structure. Further, the speed of the tests in the routine must be consistant with the anticipated speed of operation of the memory system in which the element will be used. Specifically, a test routine may subject a region to the application of 10,000 read pulses at the anticipated system clock rate, for example, to cause the region under test to achieve a controlled reproducible magnetic state as a reference for further tests. In another example, a routine might subject a region to 10 to 50 repeats of a write cycle since it is known that the write pattern is stable and the response of the region will converge monotonically to a final magnetic state within this time. The final state characterization implies that no further significant change occurs in the region after an essentially infinite number of write cycles. Heretofore, prior test systems have not satisfactorily provided the full scale of test required by plated wire elements and solved the foregoing difficult problems of proper exercising and 100 percent test coverage of the element.

2. SUMMARY OF THE INVENTION

A system and method which produces a programmed sequence of tests and analyses for a magnetic memory element to be tested. At least one test routine is selected and test control means provides programmed amplitude and pattern control signals and programmed step selection control signals. A programmed step timing control selects steps to be performed in response to the step selection control signals and also generates timing signals as programmed in each of the selected steps. The timing signals and the amplitude and pattern control signals are applied to a test pulse generator which produces test signals in accordance with these timing and control signals for performance of the tests and analyses.

Further, the test signals are applied to the magnetic memory element and the resultant response signals are analyzed by an analysis system.

3. BRIEF DESCRIPTION OF THE DRAWINGS

FIGS. 1A–D illustrate in block diagram form the entire test system 12 embodying the invention;

FIG. 1E illustrates the manner in which FIGS. 1A–D may be taken together;

FIGS. 2A–D illustrate waveforms of test signals produced by system 12;

FIG. 3 illustrates in more detail and in block diagram form a step timing control 32 shown in FIG. 1C;

FIGS. 4A–C illustrate in more detail and in block diagram form test pulse generator 40 of FIG. 1B;

Figure 1A:
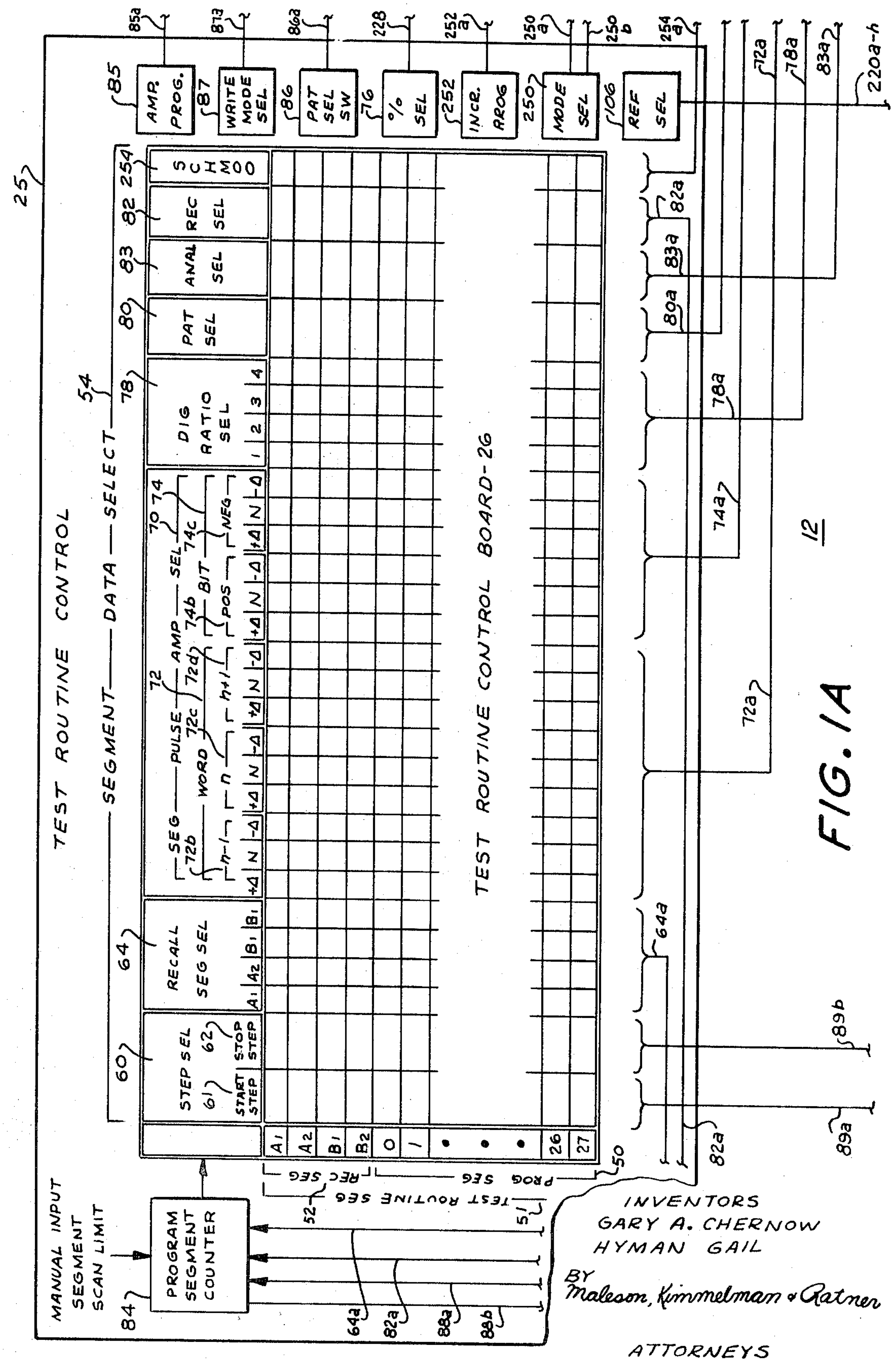
Figure 1B:
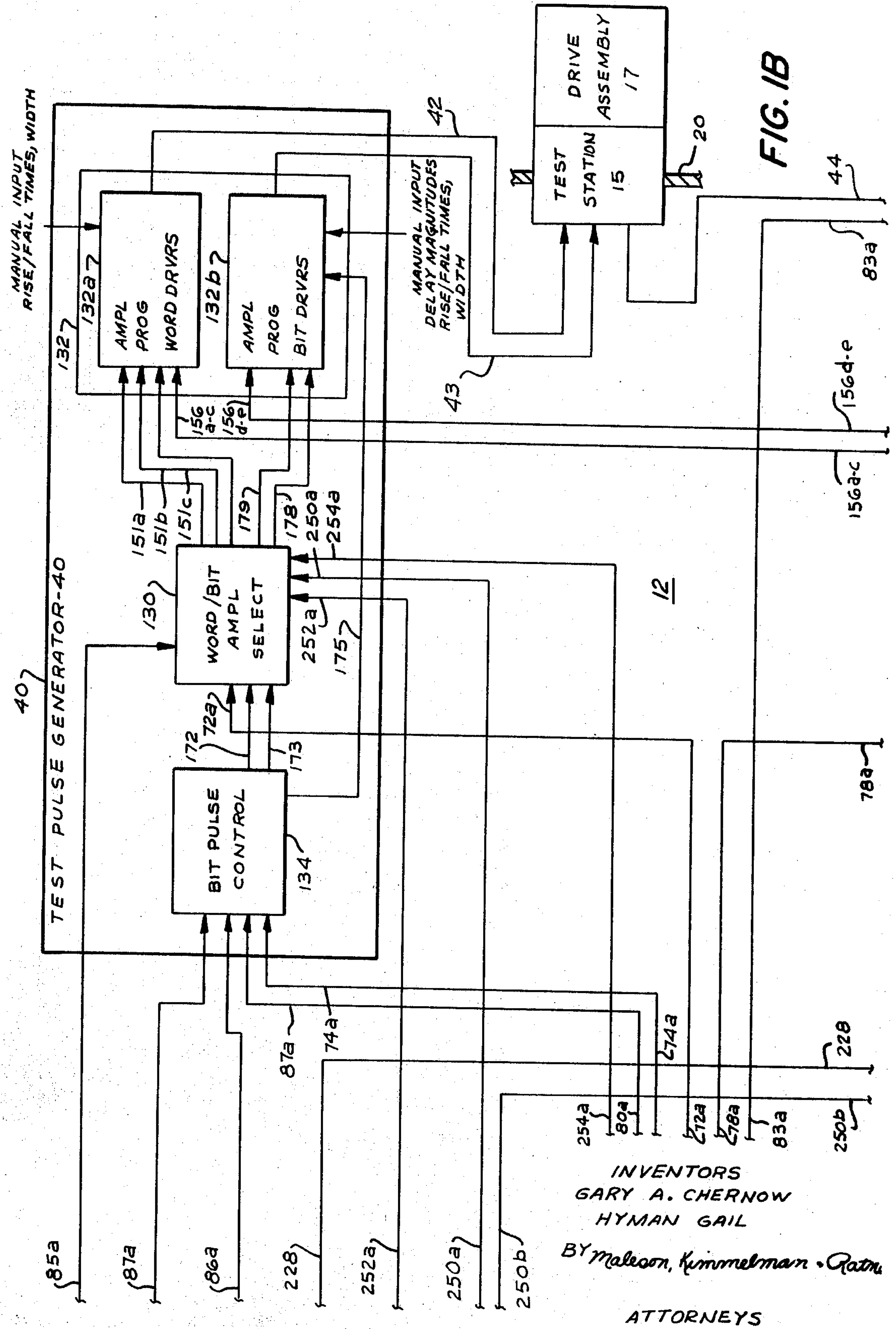
Figure 1C:
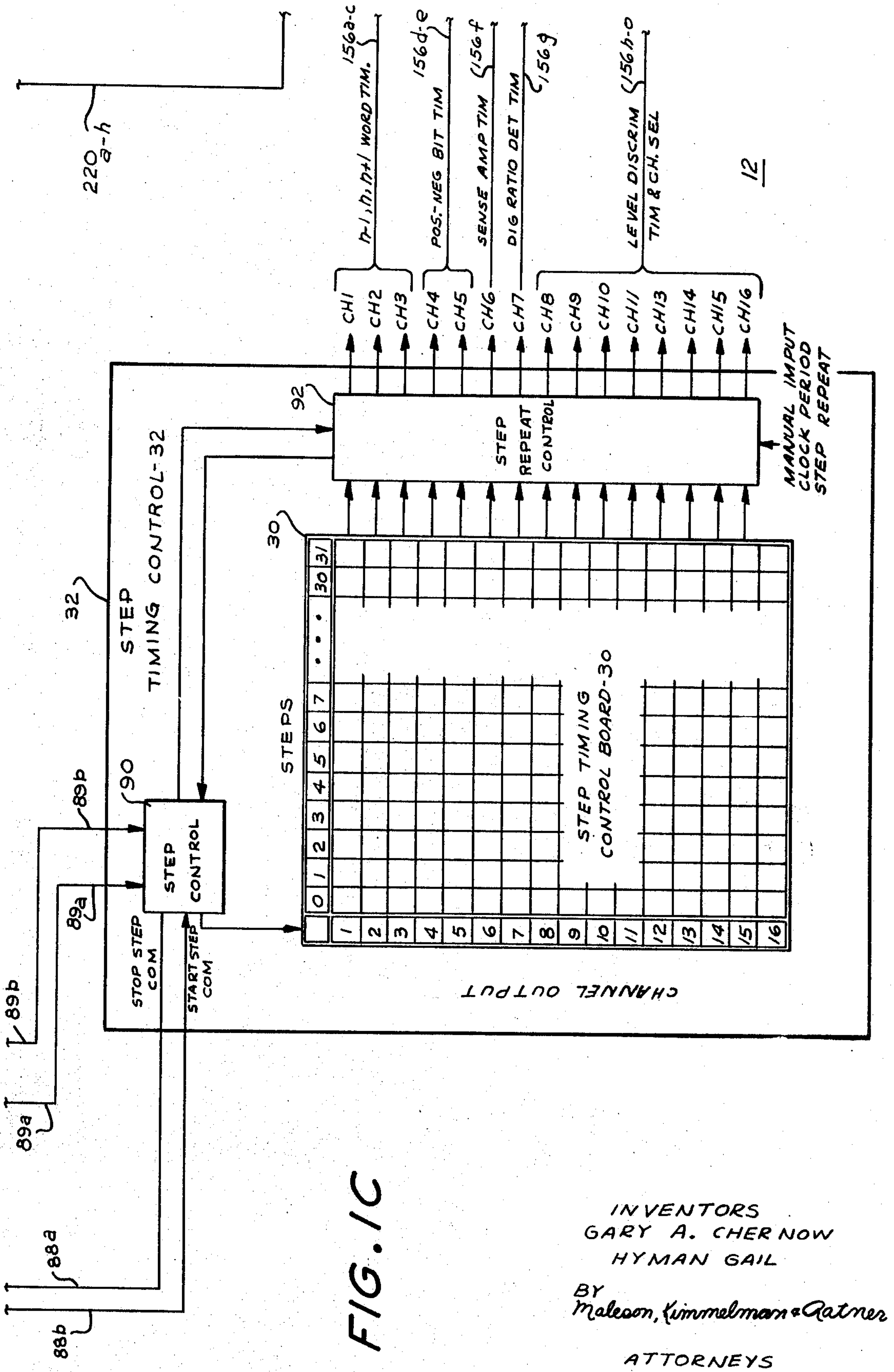
Figure 1D:
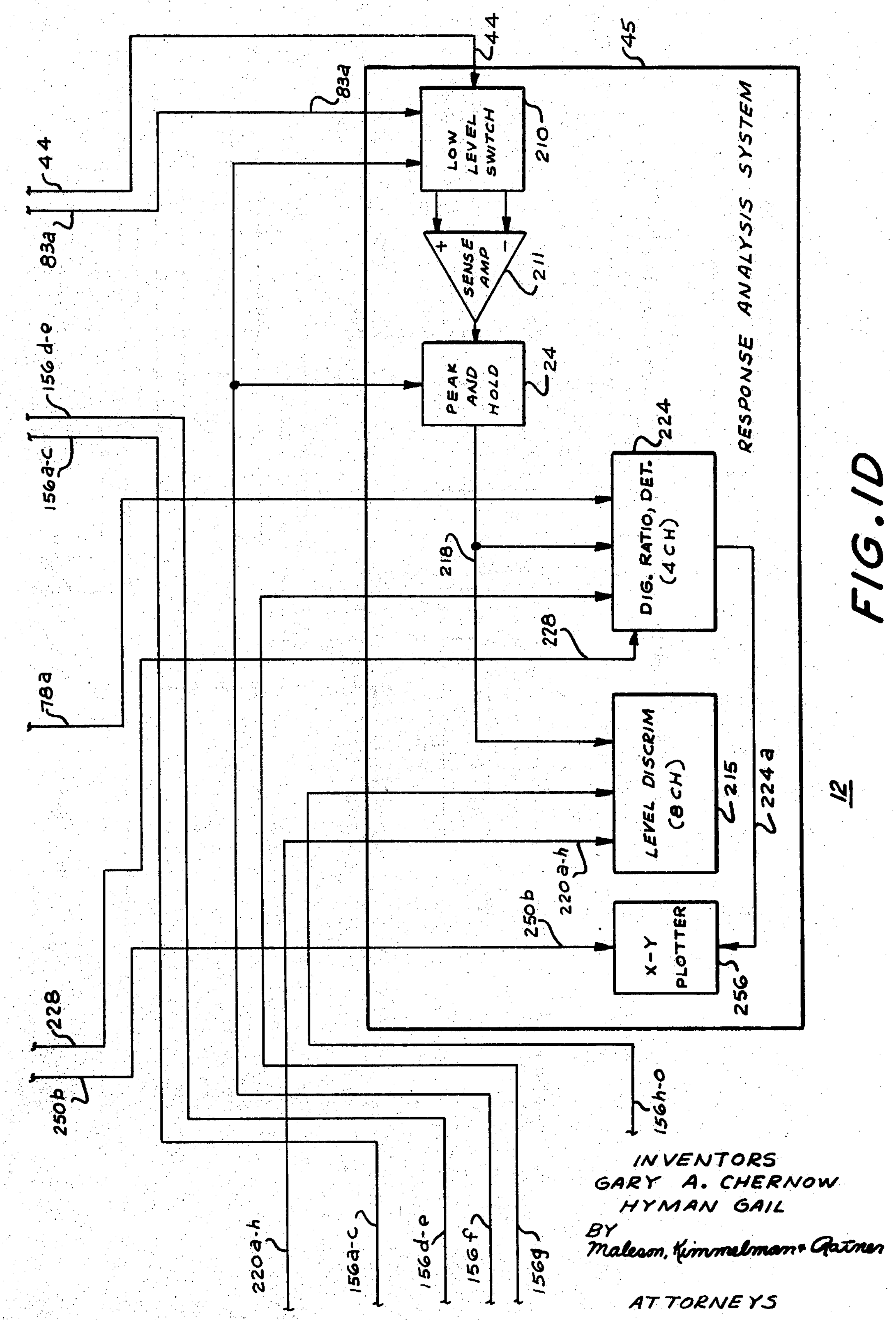
Figure 8:
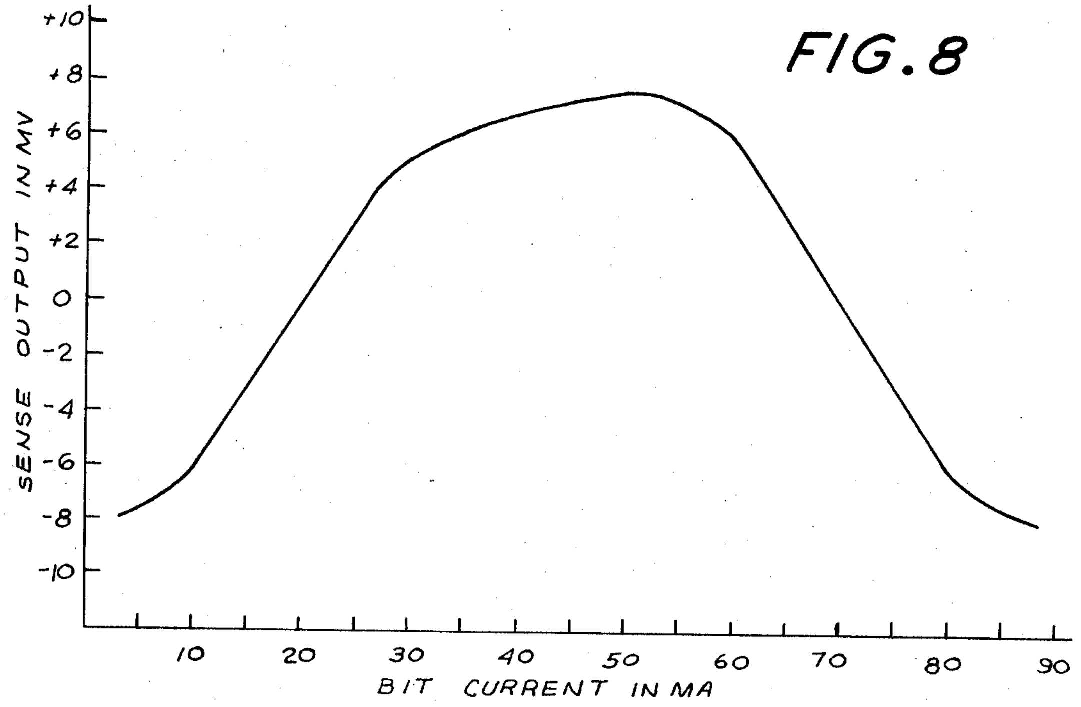
Figure 9:
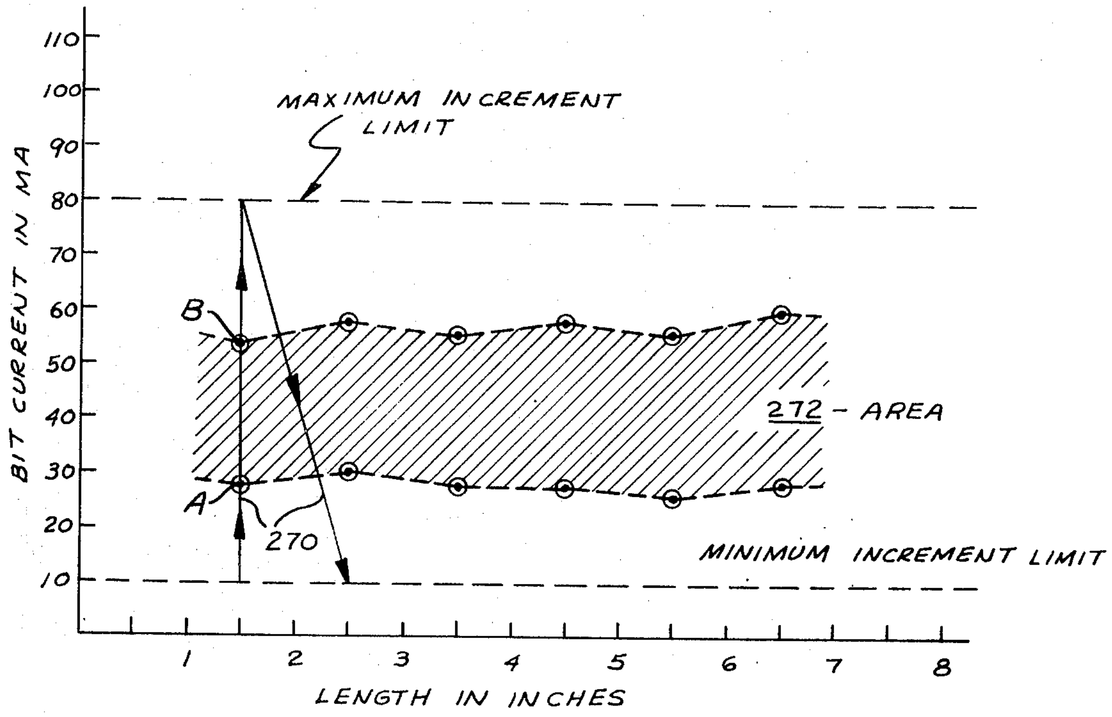
Figure 10:
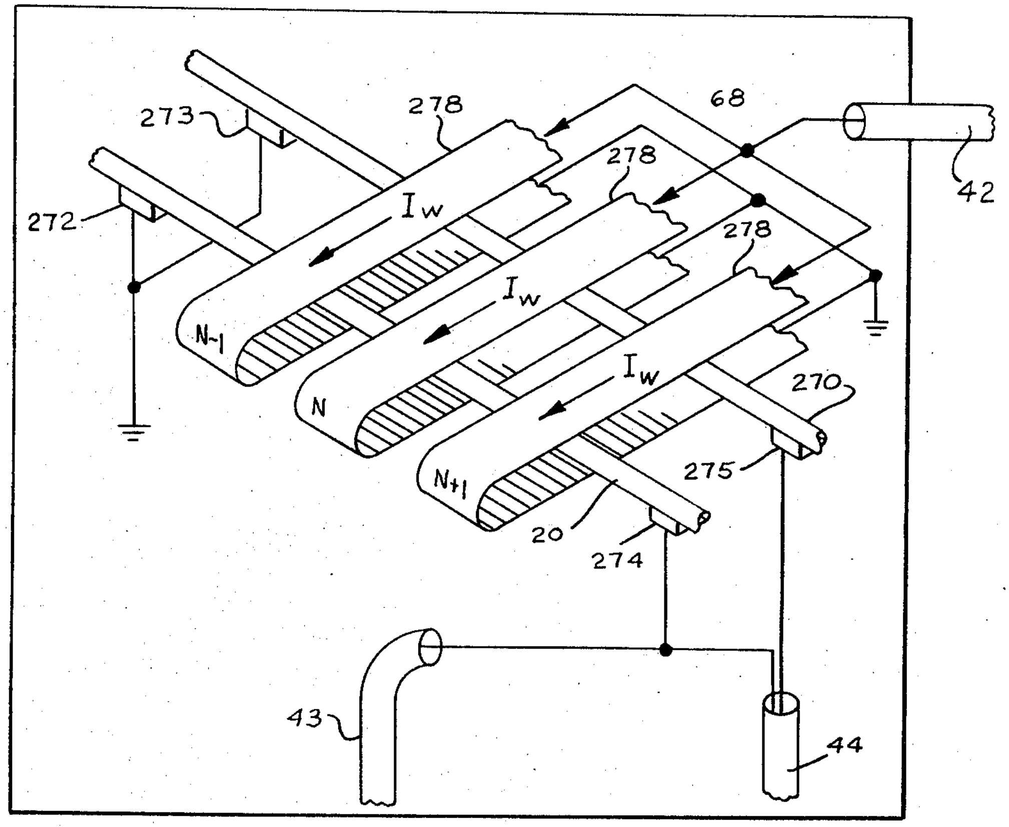
Figures 11A, 11B:
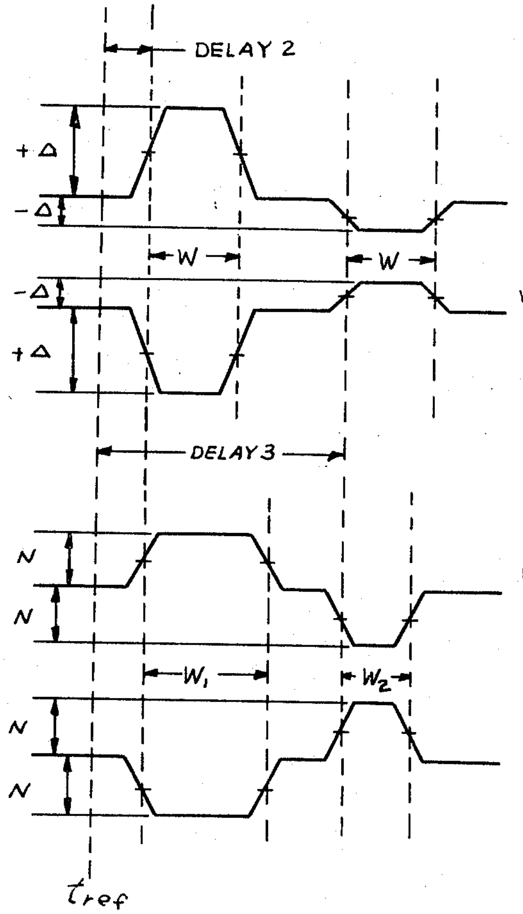
Figure 1E:
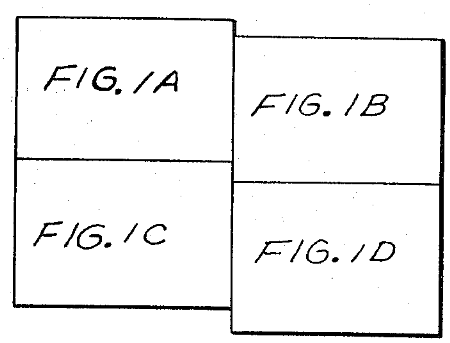

FIG. 7A–C illustrate an example of a program test routine and further show how a test routine would be programmed in boards 26 and 30;

FIGS. 8 and 9 illustrate typical plots generated during schmoo operation;

FIG. 10 illustrates plated wire element 20 within word straps of test station 15 of FIG. 1B; and FIGS. 11A–B illustrate waveforms helpful in the explanation of worst case test operation.

4. THEORY OF TEST OF MEMORY ELEMENT

The following terms used herein are defined:

test routine — programmed sequence of tests and measurements;

test routine segment — programmed portion of a test routine effective to select test signal parameters, segments to be recalled, steps to be performed;

step — programmed real time operation performing tests defined by segments in response to program generated timing signals.

A plated wire magnetic memory element test system 12 is shown in FIGS. 1A–D in which there is measured and analyzed the element response to a sequence of test operations and subroutines. System 12 may be programmed to provide a sequence of test routines using particular write mode and data patterns. In a typical test routine, three adjacent regions of the element under test, for example, regions $n-1$, n and $n+1$ are tested. The test is performed on the element in test station 15 under simulated conditions of actual operation in a memory system.

Referring now to FIGS. 2A–D, there are shown write mode signals which are typically used for differing types of elements 20. In a specific test routine, one of these write mode signals may be selected for an element response measurement of a predetermined element 20.

In each of FIGS. 2A–D, the word current pulse $I_w$ indicates the word current flowing through a word strap associated with one of the three regions and bit current pulse $I_B$ indicates the current flowing axially through the element under test.

Figure 2A:
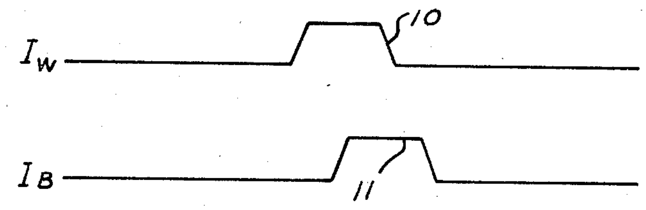
Figure 2B:
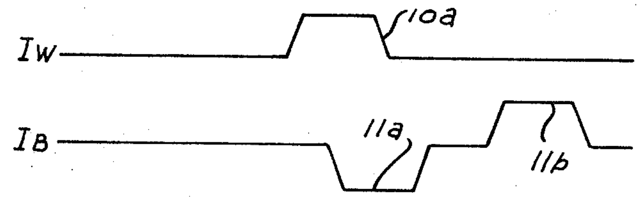

In FIG. 2A, a "write 1" is shown in which a positive going bit pulse 11 is illustrated occurring during the fall time of the word pulse 10. Accordingly, a 1 is written into the respective region of the plated wire under test. It will be understood that a negative going pulse 11 occurring during the fall time of write pulse 10 would cause a 0 to be written in the respective region. FIG. 2A with either a positive going or negative going bit pulse is defined as a unipolar single write mode. FIG. 2B illustrates a bipolar single write mode since the bit current comprises a pair of opposite polarity pulses. The opposite polarity pulses forming the bipolar bit current may comprise a positive going pulse followed by a negative going pulse or a negative going pulse followed by a positive going pulse. The signals in FIG. 2B are defined as bipolar single write with post-write disturb. In FIG. 2B, a 0 is written during the fall time of word current 10*a* and during the time of first bit current pulse 11*a*. The second word current pulse 11*b* performs a post write disturb effective for creep distortion control of the plated wire region.

Figure 2C:
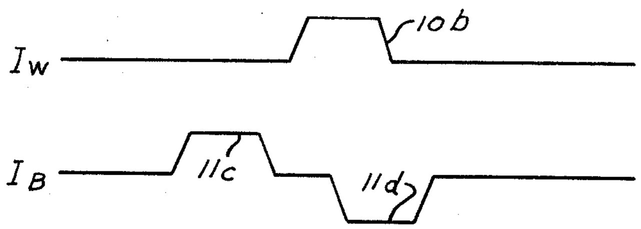

Similarly, FIG. 2C defines a bipolar single write with prewrite disturb. Specifically, as in FIG. 2B, a 0 is written during the word current 10*b* fall time. However, in this case, the fall time of pulse 10*b* occurs during the time of the second bit current pulse 11*d* in the sequence. The first bit current pulse 11*c* preceding pulse 11*d* has the effect of controlling creep distortion in the plated wire region.

Figure 2D:
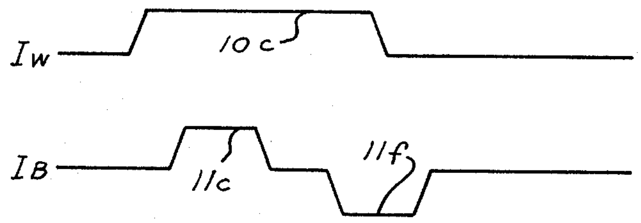

The last of the illustrative write modes, shown in FIG. 2D, is defined as bipolar overlap double write. As in FIG. 2C, a 0 is written by a second bit current pulse 11f. However, the word current pulse 10*c* is of substantially greater pulse width than pulse 10*b* so that it overlaps first bit current pulse 11*e*.

In the write modes described above, a typical word pulse $I_w$ comprises a positive unipolar word current pulse, as for example, pulse 10 in FIG. 2A. During a read mode, it will be understood that a single unipolar word current pulse 10 is generated (without a bit pulse) and only the word current pulse is applied to the element under test.

To accomplish simulated worst case testing of plated wire elements, there are two methods which may be used, both of which are based on energy considerations as applied to magnetic switching theory. A first method applies test pulse signals of constant width to the plated wire element 20 under test using any of the write modes described above. The amplitudes of the test signals, however, are controlled to simulate the desired extrema that may be anticipated in actual system operation. In this manner, the energy contained in the test pulse signals which are applied to switch the magnetic state of the element under test may be controlled since the energy contained in the pulse signal is proportional to the time integral of the pulse amplitude.

Alternatively, a second method of worst case testing may be accomplished using test pulse signals of constant amplitude but of controlled width. The test pulse width control determines that the energy contained in the pulse again represents the extrema expected in a worst case system environment. Thereby, as in the amplitude control method described above, this second method is also effective to allow a controlled switching of the magnetic state of an element under test and measurement of the response.

In a test operation, a typical subroutine comprises five portions:

1. preconditioning
2. data write
3. preread
4. disturb
5. postread

These five portions are described in detail below in the context of worst case testing using amplitude controlled test pulse signals. Alternatively, the portions may similarly be described for width controlled test pulse signals.

1. The first portion is defined as a preconditioning portion which causes the element under test to achieve a controlled reproducible magnetic state. In a typical example, this is accomplished by either parallel or sequential repetitive writing in regions $n-1$, n and $n+1$, the complement of the date pattern. This writing operation uses the maximum amplitude tolerance write pulse pattern that is anticipated in actual system operation, thereby simulating worst case environment.

2. In data write, the date pattern is written in cell n of the region under test using the minimum amplitude tolerance write pulse pattern.

3. In preread, the data previously written in cell n during data write is read and the resultant response measured. This portion of the subroutine provides a verification of the previous portions and establishes a reference for comparison with the measured response in the postread portion.

4. The disturb portion comprises at least one of a number of nondestructive disturb cycles applied to the plated wire element to simulate the worst case conditions of the element in an actual system operation. Typical disturb sequences may include:
   a. read disturb in which cell *n* is subjected to a repeated word pulse having the maximum amplitude tolerance that is anticipated in actual system operation;
   b. write disturb in which cell *n* is subjected to a repeated bit pulse pattern having maximum amplitude tolerance;
   c. adjacent cell disturb in which adjacent cells $n-1$ and $n+1$ are repetitively written with complement data using the maximum amplitude tolerance write pulse pattern;
   d. crawl disturb in which cell *n* is subjected to a repetitive maximum amplitude tolerance word pulse in conjunction with a low level complement bit pulse;
   e. creep disturb in which cell *n* is subjected to a repetitive maximum amplitude tolerance bit pulse in conjunction with a low level word pulse;
   f. interleave disturb in which cell *n* is subjected to a repetitive pulse pattern comprising a read disturb followed by a write disturb. In bipolar single write with prewrite disturb mode, for example, the leading bit pulse has maximum tolerance amplitude and complementary data polarity;

g. alternating data disturb in which cell $n$ is subjected to a repetitive pulse pattern comprising a minimum amplitude tolerance complement data write pulse pattern followed by a minimum amplitude data write pulse pattern.

5. In postread, the magnetic state and response of cell $n$ is read and measured. The resultant response measurement is compared in amplitude with the preread response and to the external references.

An example of a typical subroutine is shown below for an adjacent cell disturb test — "one" test routine:

| Program Step | Operation | No. of Events |
|---|---|---|
| 1 | precondition $n-1$ | 1,000 |
| 2 | precondition $n+1$ | 1,000 |
| 3 | precondition $n$ | 1,000 |
| 4 | write data | 1 |
| 5 | preread | 1 |
| 6 | adjacent cell | 10,000 |
| 7 | disturb (pair step repeat) | |
| 8 | postread | 1 |

In this test example, program steps 1, 2 and 3 correspond to the preconditioning history portion as described above. Steps 4 and 5 correspond to data write and preread respectively. Program steps 6 and 7 provide the adjacent word disturb as described above. Program step 8 corresponds to postread.

In most applications, the test will be repeated using the logic pattern complement of the bit pulses, thereby providing "-zero" test routine. Therefore, during a zero test routine which follows a one test routine, each of the write operations described above will write a complement data pattern in the associated region of the element under test. However, the program steps remain the same so that, for example, a precondition $n-1$ still writes with the maximum amplitude tolerance write pulse pattern albeit, the logic complement of that used in the one test routine.

5. GENERAL DESCRIPTION OF TEST SYSTEM 12

As previously described, test system 12 as shown in FIGS. 1A–D may be programmed to provide a selectable sequence of test routines in which each test routine is a programmed sequence of tests and analyses. Each routine comprises at least one programmed segment and with each segment comprising at least one programmed step.

The segments are programmed into the test routine control 25 comprising a programmable diode matrix plug board, test routine control board 26. Thirty-two test routine segments may be programmed into board 26 with each segment allowing the selection of test parameters as programmed. Test system 12 selects at least one test routine and operates in sequence thereon recalling, if so programmed in a segment being operated on, predetermined segments other than segments in the selected test routine for prior operation before returning to the selected routine. The programmed segments are operated on in sequence with each segment generating control signals to select steps to be performed as programmed in a step timing control board 30 of step timing control 32. Test routine control generates these control signals in an asynchronous manner at a rate proportional to the time required to perform the programmed steps in control 32. The selected steps are operated on in sequence to generate timing signals synchronous with an independent predetermined frequency clock signal. The timing signals are provided by way of channels 1 – 16, to control the tests to be performed on plated wire element 20 in test station 15. The test parameters programmed in the segment being operated on in board 26 are effective to program test pulse generator 40 with respect to test signal amplitude and signal pattern. Specifically, generator 40 generates test signals as a function of the programmed test parameters and in response to the timing signals on channels 1 – 5. The test signals in the form of word current and bit current pulses are applied by way of cables 42 and 43 respectively to test station 15.

The response of element 20 is taken from test station 15 by way of cable 44 and applied to a response analysis system 45 which is timed by channels 6 – 15 and enabled by control board 26 to select the mode of error analysis to be performed. Accordingly, test system 12 provides measurement and analysis of the response of element 20.

6. DETAILED DESCRIPTION OF SYSTEM 12

A. Test Routine Control 25

Test system 12 performs tests on plated wire element 20 in several modes of operation as determined by a mode select switch 250. A first mode, continuous, is applicable for on-line testing of a continuously moving plated wire element as it emerges from the plating process. All other operational modes of test system 12 are off-line and are used in testing discrete lengths of a plated wire element in conjunction with a controlled drive assembly 17 as described in U. S. Pat. application, Ser. No. 64,309, filed Aug. 17, 1970 for SYSTEM AND METHOD FOR MAGNETICALLY TESTING PLATED WIRE by James M. Major and assigned to the same assignee as the present invention.

In a first off-line mode, error recycle, test system 12 performs the desired tests and upon detection of an error or region of substandard response by response analysis system 45. System 12 provides a control signal to the off-line drive assembly 17 to maintain at test station 15 the region under test which has produced the error. In this error recycle mode, test system 12 repetitively applies the test routine to the foregoing region.

In a second off-line mode, one-shot, test system 12 sequences once through the programmed segments of a test routine as determined by the scan limits set in program segment counter 84. After the last segment of the routine is performed, system 12 terminates operation.

A third off-line mode performs schmoo testing as described below in 6F., Schmoo Operation, providing current pulse increments for either word or bits as selected.

Test routine control board 26 comprises a diode matrix pinboard which is programmed to designate a series of test operations and, further, to define the parameters that are to be generated for each test routine segment. Up to 28 test routine segments may be generated in sequential order with the segments being designated 0 – 27. In addition, there are four test routine segments A1, A2, B1 and B2 which may be recalled and performed prior to any test routine segment 0 – 27. The performance of the recall segments is determined by programming a desired segment 0 – 27. Accordingly, the operator with one diode pin per recall segment can insert, for example, the preconditioning history frequently required for many test routines and in this manner conserving program segments for programs which can not be routinely performed.

Board 26 is set up on a cartesian coordinate system with the horizontal rows 51 representing the test routine segments with rows 52 defining recall segments A1, A2, B1 and B2 and rows 50 defining program segments 0 – 27. The vertical columns 54 represent segment data selection that is to be generated for any given test routine segment 51.

The first 10 columns of segment data select 54 are step select 60 which comprises as the first five columns start step 61 and the second five columns, stop step 62. For the start step 61, a 5 bit binary coded number is used to define the initial step of a test routine segment. The insertion of a diode within the five bits represents a binary one for the corresponding bit weight. For the stop step 62, a 5 bit binary coded number is used to define the final step of a test routine segment. Recall segment select 64 comprises four columns A1, A2, B1 and B2. A diode inserted in a respective column in the manner previously described, recalls the appropriate recall segment 52 at the beginning of a program segment 50 being so programmed for recall.

The programming of the amplitude of the word and bit current pulse test signals is determined in segment pulse amplitude select columns 70. Associated with each of the word current drivers, there is provided word pulse amplitude select columns 72 which comprise three columns +Δ, N and −Δ respectively for each 72*b–d* of the $n-1$, n and $n+1$ word straps. A diode inserted in any one of the foregoing three groups of three columns generates a word amplitude select signal corresponding to one of the three preselected current amplitudes for the respective word. A total of nine columns are accordingly required in board 26 to control the amplitude of the $n-1$, n and $n+1$ word drivers 132*a* as a function of the test routine segments. Similarly, for the bit current drivers there are 6 bit pulse amplitude select columns 74 with three columns 74*b* corresponding to the positive driver and three columns 74*c* to the negative driver. These columns generate the bit amplitude select signals.

Digital ratio select columns 78 comprise four columns which are used in conjunction with digital ratio detector 224 in analysis system 45. These columns directly correspond to the digital ratio detector channels 1 through 4. A diode inserted in one of the columns enables the corresponding digital ratio detector channel for a comparison event of the program segment associated with that diode location.

Pattern select 80 determines the data pattern as either ones or zeroes. A diode inserted in the column determines the pattern to be 1.

A segment recycle select column 82 allows the system to continue generating the test parameters as programmed in the test segment and recycle the segment on a continuous basis without going to the next segment. A diode inserted in this column 82 accomplishes the foregoing recycling operation.

An analyze select column 83 is effective to enable the error detection logic channels. A diode in this column 83 is required in a program segment to accomplish an analysis operation.

There are several control selections which are not located within board 26 although these controls are located within the main control 25. These control selections are as follows:

Program segment counter 84 — a test routine will comprise one or more segments any sequence of which may be selected by the operator using external switches in counter 84. Counter 84 is effective to control test system 12 operation so that the selected segments are sequentially performed.

Pattern select 86 — an external switch is used in conjunction with pattern select column 80. With the switch in a first position, the pattern information in column 80 is used during segment operation. With the switch in a second position, the complement of the pattern information is used. In a third position, the information in the pattern column is first used during the test routine segment and then the complement is used during a repetition of the segment. In this manner, a segment is repeated once using the amplitude parameters programmed in the segment 50 and controlled by bit pulse control 134 described below but with a complement data pattern.

Write mode select 87 — an external switch is used to select by way of line 81 which of the fundamental write modes as described above are to be used during test operation. With the switch in a first position, unipolar write is selected and with the switch in a second position, bipolar write is selected. The detailed write pulse parameters comprising relative delay, amplitude, pulse width, rise and fall time are determined in test pulse generator 40 as discussed below.

Amplitude programmer 85 — an array of operator controlled switches provides ten bit storage of three values of test amplitudes for each of the $n-1$, n and $n+1$ word test signals and eight bit storage of three values of test amplitudes for both the positive and negative bit test signals. The three values for each test signal are designated N, +Δ and −Δ. Generally, the stored values are programmed to correspond to a nominal value, N, and plus and minus tolerance values, +Δ and −Δ, representing maximum and minimum expected values, respectively. Each of the binary coded stored values is transferred by way of cable 85*a* to pulse generator 40 where selection of the particular values to be used within a given segment is accomplished.

Percentage select 76 — four pairs of operator controlled switches with binary coded outputs corresponding to preselected digits 0 through 100 are used to store percentage multipliers for use in determination of error conditions in digital ratio detector 224 analysis. The percentage values set up a tolerance range of acceptability for stored response characteristic 218*a*.

Reference select 106 — eight potentiometer operator controls generate analog voltage reference levels which may be used as comparison thresholds for response analysis in each of the respective channels in level discriminator 215. The predetermined analog reference levels are applied to discriminator 215 by way of cables 220*a–h*.

B. Step Timing Control 32

Figure 3:
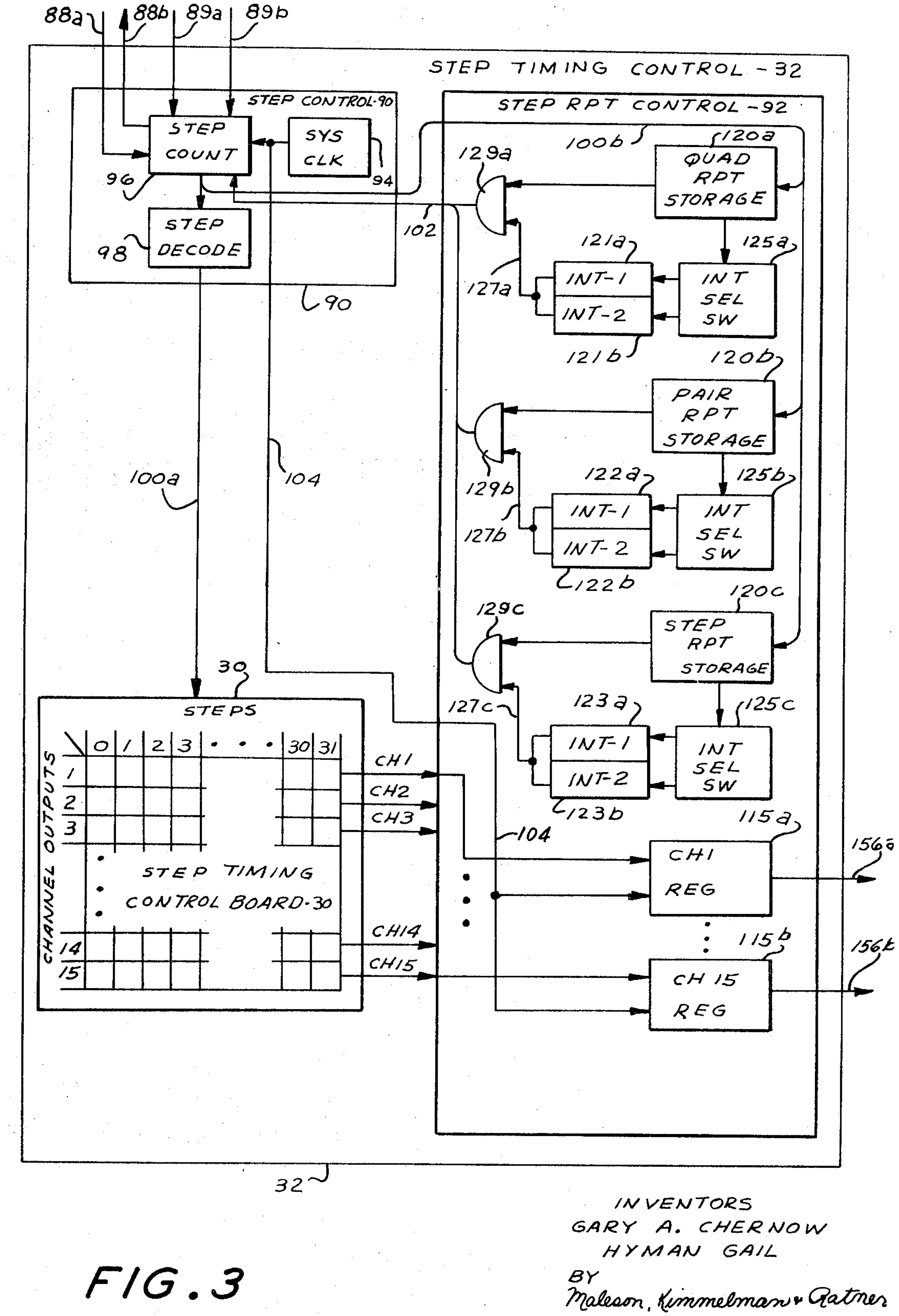

Step timing control 32, shown in more detail in FIG. 3, includes step timing control board 30 which comprises a diode matrix of the pinboard type having sixteen rows each corresponding to a differing parallel output channel 1 - 16. There are 32 columns 0 - 31 provided, each corresponding to a differing step which controls a real time operation. Within a particular step column, a diode plugged into a selected channel determines that a pulse timing signal is provided during operation of that step on that channel at the time of the system clock pulse as provided by system clock 94. As previously described, the program steps to be performed are programmed in step select column 60 of board 26 which has output connections through cables 89*a* and 89*b* to step control 90 of control 32. Step control 90 comprises a binary up counter 96, a step decoder 98 and a system clock generator 94. The step select cables 89*a–b* are applied to counter 96 which, on command from test routine control 25 by way of cable 88*a*, counts under the control of clock 94 beginning at the initial step of the selected sequence. The count output signals from counter 96 are applied to step decoder 98 which operates effectively as a selector switch to take the binary state of counter 96 and decode it to the equivalent step for board 30. Board 30 is effective to generate the appropriate timing pulses on the respective channel outputs. In this manner, step counter 90 sequentially selects the steps which have been programmed in step select 60 and performs those steps in sequence. At the completion of the final step in the selected sequence, a command signal is applied by counter 96 to test routine control 25 by way of a cable 88*b*.

Counter 90 is further controlled by a step repeat control 92. This control may be operated on to repeat any one step for a predetermined period of time (defined as "step repeat"); repeat a pair of steps for a predetermined period of time ("pair repeat"); or repeat a four step sequence for a predetermined period of time ("quad repeat"). In order to accomplish the foregoing, control 92 controls the operation of binary counter 96 to continually return that counter to the appropriate step and enable the desired sequence to be repeated successively for the duration of the predetermined repeat interval. As binary counter 96 advances through its count, the state of counter 96 is applied by way of decoder 98 and then cable 100*a* to board 30 and by way of cable 100*b* to quad, pair and step repeat storage controls 120*a–c* respectively of control 92. Each of the controls 120*a–c* comprises an array of switches, each switch corresponding to a particular quad, pair or step sequence which may be preselected to be repeated by the operator.

If the state of counter 96 on cable 100*b* corresponds to a predetermined repeat step stored in repeat storage control 120*a*, then there is a quad repeat; if in control 120*b*, then there is a pair repeat; and if in storage 120*c*, then there is a step repeat. A quad repeat has precedence over a pair repeat and both have precedence over a step repeat. When the state of counter 96 matches the contents of one of storage controls 120*a–c*, an output is applied to a respective one of control gates 129*a–c* and one of interval select switches 125*a–c*. Interval select switches 125*a–c* are associated with each of the storage controls 120*a–c* and may be set by the operator to select either of two predetermined repeat intervals for each quad, pair or step selected to be repeated. Each of interval select switches 125*a–c* is effective to trigger one of two one-shot interval circuits 121*a* or *b*, 122*a* or *b*, and 123*a* or *b* respectively upon application of the output signal from storage control 120*a–c*. The one-shot interval circuits are set with a period that may be selected manually. Interval circuits 121*a–b*, 122*a–b* and 123*a–b* are connected to gates 129*a–c* by respective cables 127*a–c* and are effective to apply a logic signal of the selected duration to one of respective gates 129*a–c*. This gate, in turn, is effective to apply a signal by way of conductor 102 to counter 96 to cause that counter to recycle to the first step of the quad, pair or step to be repeated. At the termination of the selected one-shot interval signal, the respective gate 129*a–c* by way of cable 102 causes counter 96 to advance to the next step in the selected sequence. For example, in operation, when the state of counter 96 corresponds to a quad repeat in control 120*a*, then control 120*a* applies signals to gate 129*a* and select switch 125*a*. Switch 125*a* is effective to initiate one-shot interval 121*a* or *b* as selected which in turn generates a logic signal on cable 127*a* of predetermined duration from the selected interval circuit 121*a* or *b*. During the duration of the logic signal of cable 127*a*, gate 129*a* is effective by way of line 102 to reset counter 96 to the appropriate state thereby to accomplish the required quad repeat operation for the duration of the preselected time interval as determined by switch 125*a* and one-shot interval 121*a*. When the logic signal on cable 127*a* terminates, then gate 129*a* is effective to allow counter 96 to advance to the next step in the selected sequence. In this manner, a quad is repeated for a desired interval of time at the system clock rate with that interval being programmed in either interval circuit 121*a* or 121*b* as determined by switch 125*a*. Pair and step repeat operations include identical circuits and are accomplished in the same manner as described above.

Associated with each of the channel outputs 1 – 15 is an individual associated register 115a-o each of which stores the timing information as programmed by diodes in board 30. Accordingly, this timing information stored in board 30 by the diodes at the corresponding steps is transferred to registers 115*a–o* and clock out on respective cables 156*a–o* by timing pulses from system clock 94 applied by way of line 104. In this manner, system 12 timing signals are generated. After clocking out registers 115*a–o*, control 32 operation continues by incrementing counter 96 until reaching the stop step as determined by cable 89*b* from test routine control 25, whereupon a command signal is sent to test routine control 25 by way of cable 88*b*.

C. Test Pulse Generator 40

Figure 4A:
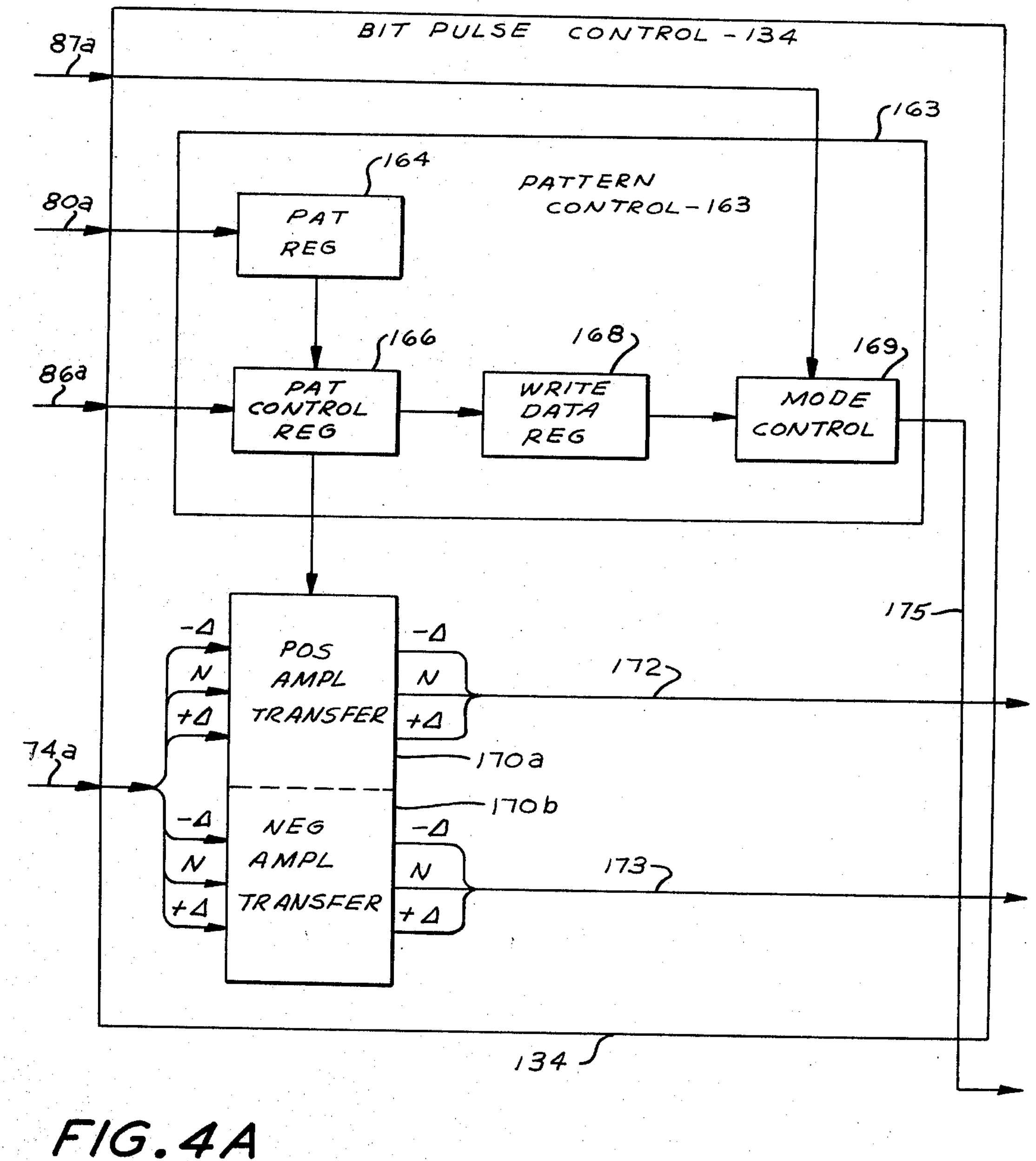
FIGS. 4D and 5 illustrate waveforms helpful in the explanation of test pulse generator 40.
Figure 4B:
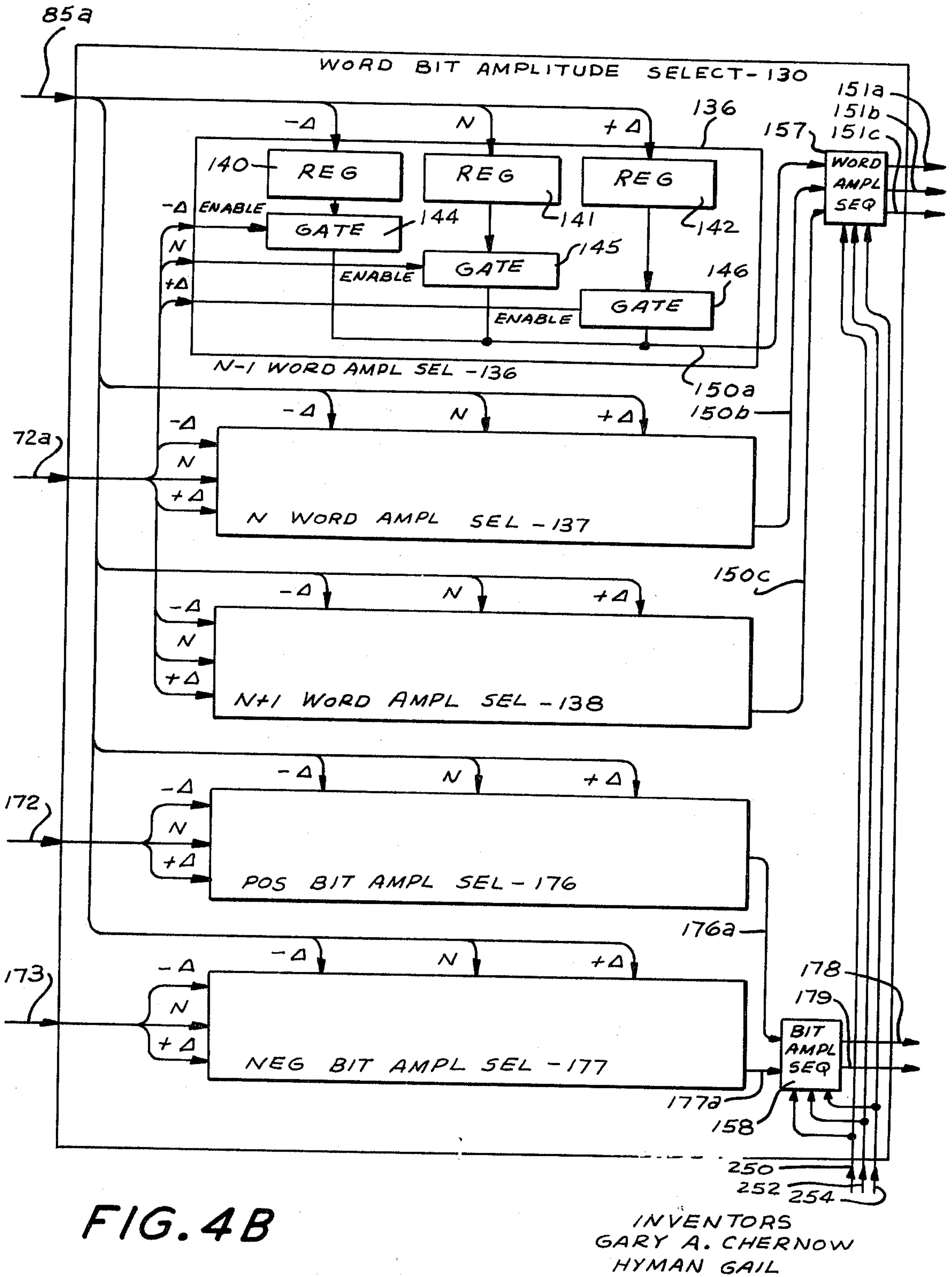
Figure 4C:
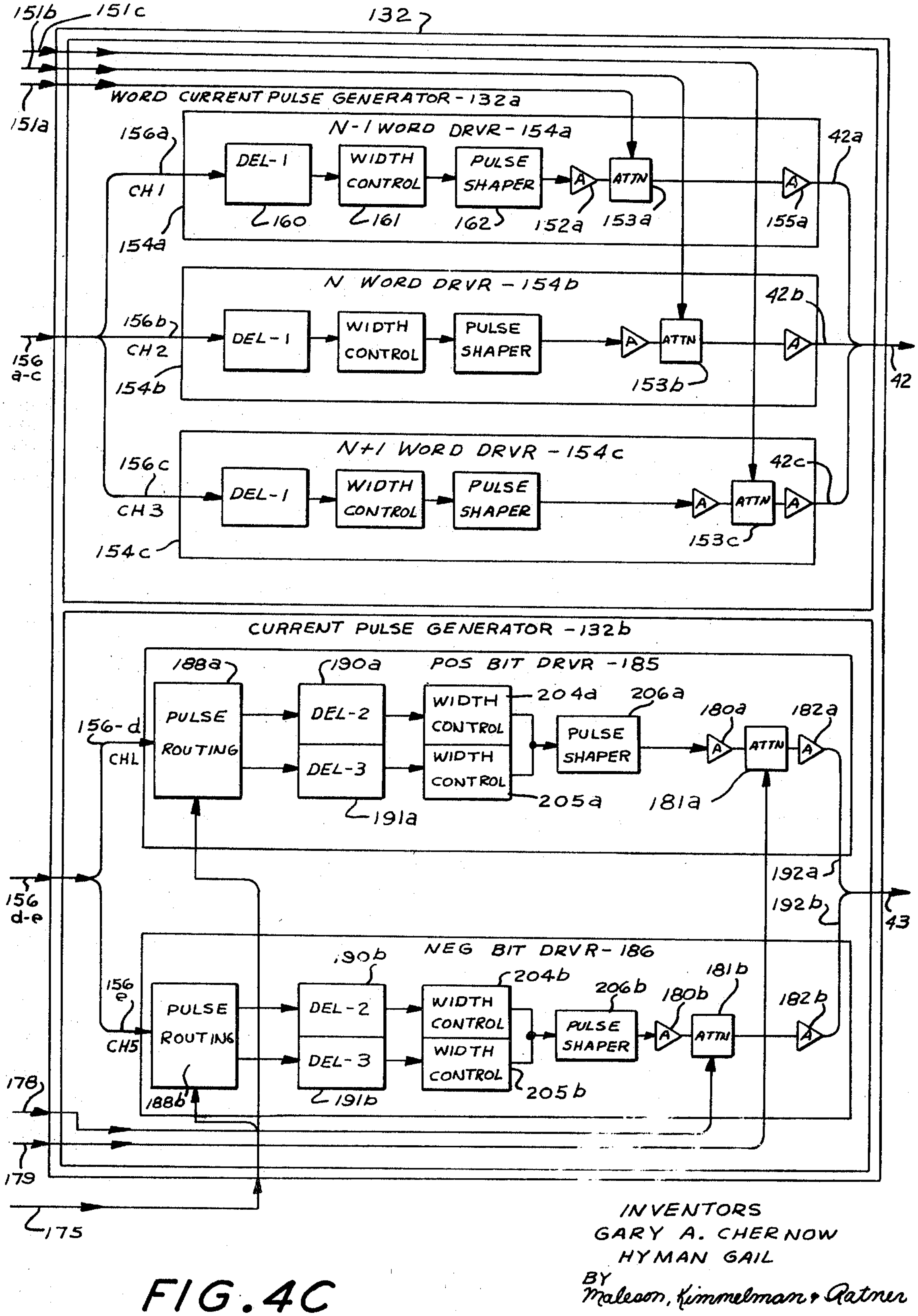

Test pulse generator 40 is shown in more detail in FIGS. 4A–C. Test pulse generator 40 comprises a word/bit amplitude select 130, amplitude programmable word/bit drivers 132 and bit pulse control 134. Select 130 is effective to store three 10 bit amplitude value signals for each $n-1$, $n$ and $n+1$ words as set in amplitude programmer 85. In addition, select 130 is effective to store three 8 bit amplitude value signals for each positive and negative bits as set in programmer 85. It will be understood that system 12 may select only from the foregoing stored amplitude values for generation of test signals except during Schmoo Testing which is later described. These amplitudes, both word and bit, are used to program current drivers in current pulse generator 132. Further, the pattern for the bit pulses produced by current pulse generator 132 is controlled by pattern control 134.

In the generation of the amplitude programmable test pulses, test pulse generator 40 is effective to ensure that the rise and fall times of the pulse are controlled and constant since the peak and shape of the response signal in the plated wire is directly affected by the switching speed of the magnetic regions.

Figure 4D:
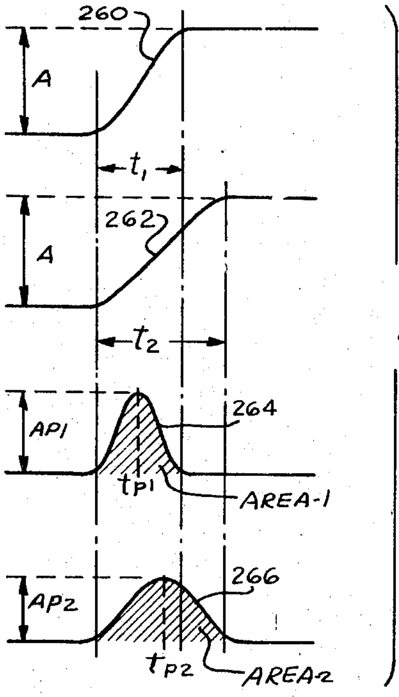

The dependence upon rise time is shown, for example, in FIG. 4D in which word current pulse 260 has rise time $t_1$, and word current pulse 262 has rise time $t_2$. Since both word pulses 260 and 262 have the same current magnitude, the resultant magnetic flux change in the plated wire is the same in each case with the result that the respective response signals 264 and 266 are of equal energy; the energy being proportional to the area below each pulse. However, since both response signals occur only for the duration of the magnetic switching intervals $t_1$ and $t_2$ respectively, it is to be understood that pulse 264 must have a higher peak value and be of shorter duration than pulse 266 in order to maintain the correct energy relationship. Further, since plated wire memory elements are evaluated in terms of peak amplitude response and peak time, it follows that the test signal rise and fall times are of major importance in test system 12. In order to obtain precision measurements of the plated wire characteristics, test signals must be generated with constant rise and fall times regardless of amplitude. Generator 40 is effective to provide amplitude programmable constant rise and fall time test pulses by utilizing drivers to first generate single amplitude test pulses which are then applied to binary selectable attenuation networks under control of amplitude sequencers and then to current amplifiers. In this manner, generator 40 achieves controlled amplitude pulse generation without affecting rise and fall times and avoids production of controlled amplitude pulses with constant slopes and resultant amplitude dependent rise and fall times.

(1) Word Pulse Generation

Cable 85*a* from programmer 85 is connected to each of $n-1$, $n$ and $n+1$ word amplitude select 136 – 138 respectively. Selects 136 – 138 are each identical and therefore only one of them, select 136, need be described in detail. The amplitude value signals from programmer 85 are applied to select 136 – 138 so that value signals relating to $n-1$ word are applied to select 136; value signals relating to $n$ word are applied to select 137; value signals relating to $n+1$ word are applied to select 138.

For the $n-1$ word, the $-\Delta$, N and $+\Delta$ value signals are loaded into amplitude registers 140 – 142 respectively. Registers 140 – 142 apply their contents to selection gates 144–146 respectively with the outputs of these gates being applied to cable 150*a*. The amplitude select signals programmed in the $n-1$ word column 72*b* from test routine control board 26 are connected by way of cable 72*a* to selection gates 144 – 146 with the $-\Delta$ column select signal being connected to gate 144, N column to gate 145 and $+\Delta$ to gate 146. A diode in one of these columns of board 26 in a segment being operated on is effective to enable the associated selection gate 144 – 146, thereby allowing the contents of the corresponding register 140 – 142 to be applied to cable 150*a*. Similarly, the $n$ word provides a signal on cable 150*b* and the $n+1$ word an amplitude control signal on cable 150*c*.

The respective signals on cables 150*a–c* are applied to a word amplitude sequencer 157 which directly transfers the amplitude control signals by way of cables 151*a–c* to word current pulse generator 132*a* comprising word drivers 154*a–c*. The operation of sequencer 157 will later be described in detail with respect to "shmoo" operation.

The gain setting for word current drivers 154*a–c* is controlled by the amplitude control signals on cables 151*a–c* respectively which are applied to binary selectable attenuators 153*a–c* which form a part of $n-1$, n and $n-1$ word drivers 154*a–c* respectively.

Timing signals produced by step timing control 32 are applied by way of channels CH1–3 on cables 156*a–c* and applied to drivers 154*a–c* respectively. Since each of the word drivers 154*a–c* is identical, only driver 154*a* need be described in detail. For example, a timing signal on channel CH1 cable 156*a* corresponds to $n-1$ word timing and is applied by way of a delay network 160, width control network 161 and a pulse shaper 162 and then to the input of amplifier 152*a*. Networks 160 – 162 are each adjustable to set the parameters for system test requirements. In this manner the timing pulse on channel CH1 generates a test pulse signal which is accordingly delayed, width controlled and shaped in a predetermined manner to set rise and fall times. Amplifier 152*a* provides a pulse to selectable binary attenuator network 153*a* where the amplifier of the test pulse is scaled under control of cable 151*a* from amplitude sequencer 157. The scaled test pulse from network 153*a* is applied to current amplifier 155*a* where the test pulse is amplified to conform to requirements programmed in the segment being operated on. The output of amplifier 155*a* is applied by way of conductor 42*a* to test station 15. Similarly, test pulses are provided for the n and n+1 words on cables 42*b* and 42*c* in response to timing signals on channels CH2-3 cables 156*b–c*. The three word test signals are applied by way of cable 42 to test station 15.

(2) Bit Pulse Generation

The pattern select signal programmed in pattern select column 80 of test routine control board 26 is transferred by way of cable 80*a* to a pattern register 164 of bit pulse control 134. A diode in the pattern select column 80 represents a "1" and no diode represents a "0." The output of register 164 is applied to pattern control register 166 which is under control of pattern select 86 by way of cable 86*a*. Switch 86 is a 3 position switch. In a first position, "pattern," the information stored in register 164 is directly transferred to write data register 168. In a second position, "complement," the information stored in register 164 is complemented and then applied to register 168. In a third position, "both," the information in register 164 is first transferred to register 168 and the segment operation continues until completion after which the segment operation is repeated with the complement of the contents of register 164 being transferred to register 168.

The information in register 168 is applied by way of a mode control 169, under the control of write mode select 87 to a write pattern cable 175. Select 87 is effective to determine whether unipolar or bipolar operation is effected. Accordingly, the mode control 169 is effective for unipolar operation to allow the generation in bit driver 132*b* of either positive or negative bit current pulses but not both. In bipolar operation, a bit test signal comprises both a positive and a negative current pulse. Both the positive and negative bit amplitude select signals programmed in column 74 are applied by way of cable 74*a* to a pattern-complement amplitude transfer 170 with positive and negative information being applied as indicated. During all operations when pattern control register 166 directly transfers the information stored in register 164, as previously described, transfer 170 directly transfers the programmed information from board 26. Thus, the positive bit select signal information is transferred by transfer 170*a* directly to the corresponding positive bit information cable 172 and the negative bit information is transferred by transfer 170*b* to the negative bit information cable 173.

However, when register 166 complements the data in register 164, then transfer 170*a* transfers the positive bit information so that the $-\Delta$ bit information is applied to the $+\Delta$ line of cable 172 and the $+\Delta$ input is transferred to the $-\Delta$ line of cable 172. There is no transfer of the N bit information. Similarly, the negative bit information is transferred by transfer 170b with $-\Delta$ information to the $+\Delta$ line and $+\Delta$ information to the $-\Delta$ line of cable 173.

The purpose of pattern-complement amplitude transfer 170 will now be explained using FIG. 2C which shows a write 0 with a prewrite disturb. It may be desired to perform the test in a worst case condition in which the disturb pulse 11c would have the maximum positive amplitude tolerance value $+\Delta$ as programmed in amplitude programmer 85 while the write 0 bit pulse 11*d* would have a minimum negative amplitude tolerance value $-\Delta$. It is understood that amplitude programmer 85 provides both $+\Delta$ and $-\Delta$ values for both positive and negative pulse components 11*c* and 11*d* respectively. In the complement situation, it would be further understood that the disturb pulse would be negative going and would have for the worst case condition the maximum negative amplitude tolerance value, $+\Delta$, so that the disturb pulse produces the maximum disturbance while the write 1 bit pulse would have a minimum positive amplitude tolerance value, $-\Delta$. In the foregoing, it has been assumed that amplitude programmer 85 has been set so that $+\Delta$ values indicate maximum absolute values of the bit pulses, and $-\Delta$ values indicate minimum absolute values.

The tests previously described in 4. Theory of Test of Memory Element are generally performed first writing the pattern as programmed and then repeated using the complement of that pattern. In this manner, the test is performed once through by writing 1's and again by writing 0's. In a nominal case, nominal 1's and 0's are written using the N value as stored in amplitude programmer 85 while in the worst case, the tolerance values previously described are selected. Rather than setting up separate test routines for the 0 and 1 portions of the test, bit pulse control 134 provides automatic complementing during worst case testing.

For worst case testing using the second simulation method described in 4. Theory of Test, amplitude control signals with the nominal value, N, are required. Transfer 170 transfers both the positive and negative N values directly to the respective N lines of cables 172 and 173 during both the one and zero test routines. The worst case width control of the test pulse signals is provided by the pattern control signal on cable 175 which is applied to pulse routing controls 188*a–b* of positive and negative bit drivers 185, 186. A detailed description is provided below.

The positive bit amplitude and pattern information on cable 172 is applied to positive bit amplitude select 176 and the negative bit information on cable 173 is applied to negative bit amplitude select 177. Selects 176 and 177 are identical in construction and operate the same as that of select 136 to generate the amplitude control signals to determine the amplitude of the test signal to be generated.

Signals 176*a* and 177*a* are applied to a bit amplitude sequencer 158 which directly transfers the bit amplitude control signals by way of cables 178,9 to current pulse generator 132*b* comprising positive and negative bit drivers 185,6 respectively. The operation of sequencer 158 will later be described with respect to schmoo operation. The outputs 178 and 179 are applied to positive and negative bit drivers 185 and 186 as amplitude controls for binary selectable attenuation networks 181*a,b* respectively. Positive bit driver 185 is effective to produce positive pulses and negative bit driver 186 is effective to produce negative pulses.

The positive and negative bit timing signals on channels 4 and 5 respectively are applied by way of cables 156*d,e* to pulse routing circuits 188*a–b*. Routing circuits 188a-b are controlled by cable 175 so that the timing pulse on channel CH4 cable 156*d* is applied either to delay network 190*a* and width control 204*a* or to delay network 191*a* and width control 205*a*. Similarly, a channel CH5 timing pulse applied from cable 156*e* may be routed either to delay 190*b* and width control 204*b* or to delay 191*b* and width control 205*b*. Delays 190*a,b* provide delays indicated as "2" while delays 190*a,b* provide delays indicated as "3."

Figure 5:
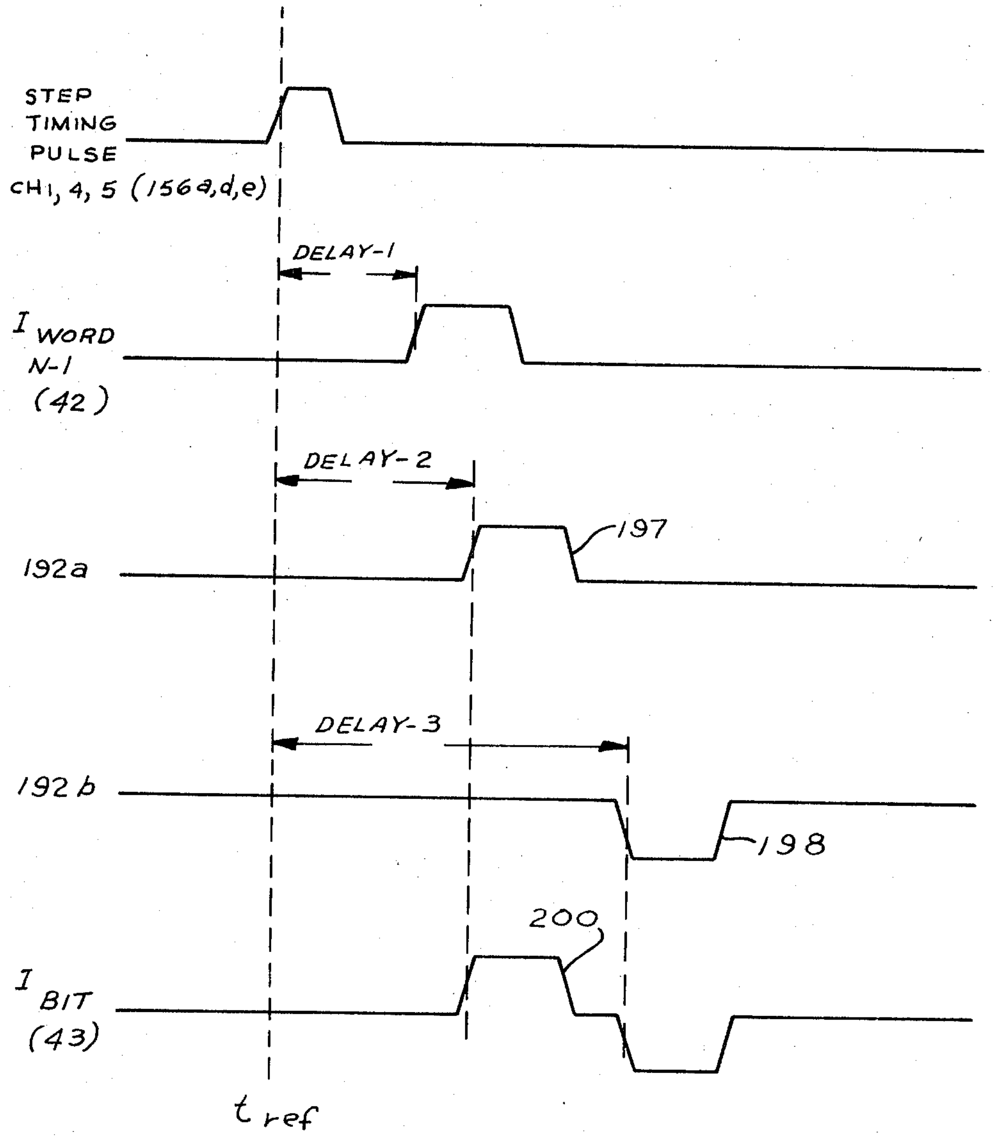

As illustrated in FIG. 5, for example, with an *n*−1 word write "1" operation using bipolar post write disturb mode, there are timing pulses on cables 156*a*, 156*d,e* representing channels 1, 4 and 5 as generated by step timing control 30. The timing pulse on channel 1 indicates that there is an *n*−1 word. Thus, *n*−1 word current pulse 197*a* is produced having delay "1" on line 42 from driver 154*a*. In order to write 1, delay "2" 190*a* and width control 204*a* are selected by means of pulse routing 188 and the signal on cable 175 to produce bit pulse 197. In order to obtain the second or bipolar post write disturb portion, delay "3" 191*b* and width control 205*b* are selected by routing 188*b* and the signal on cable 175 to produce pulse 198. Accordingly, there is produced at bit station 15 a composite bit pulse 200. In order to write 0, the pattern control signal on cable 175 is effective to control pulse routing 188*a* and 188*b* so that the delay "3" 191*a* and width control 205*a* are selected for positive bit driver 185 and further so that the delay "2" 190*b* and width control 204*b* are selected for negative bit driver 186. The width control 204*a,b* and 205*a,b* and pulse shapers 206*a,b* are similar in construction and provide identical function to that provided by control 161 and shaper 162 respectively. Amplitude control of the bit current pulses is controlled by amplitude control signals on cables 178 and 179 as applied to selectable attenuators 181*a,b* in a manner identical to that described above for word driver 154*a*.

Worst case test signals are produced by drivers 185 and 186 in accordance with either of the amplitude or width control methods described in 4. Theory of Test of Memory Element. FIG. 11A shows prewrite disturb write 1 and write 0 for the amplitude control method. To employ the amplitude control method, width controls 204*a,b* and 205*a,b* are set to produce pulses of equal width, W, and the pattern control signal on cable 175 applied to pulse routing 188*a,b* serves only to select from delay "2" and delay "3" to determine the data to be written, either 1 or 0. Test pulse amplitude is controlled by signals from cables 178 and 179 as determined by amplitude programmer 85 and transfer 170 as described above to binary attenuators 181*a,b* during both the one and zero test routines.

Test pulses for the width control method of worst case testing, shown in FIG. 11B for prewrite disturb write 1 and write 0, are produced with width controls 204*a,b* set to produce pulses of a first width, W1, and controls 205*a,b* set to produce pulses of a second width, W2. The pattern control signal on cable 175 applied to pulse routing 188*a,b* is then effective to both determine the pattern, either 1 or 0, by selecting from delay "2" and delay "3" and also the pulse width. Test pulse amplitudes are held constant by control signals on cables 178 and 179 during both the one and zero test routines.

Either of the above described methods may be used to provide programmed worst case analysis on plated wire element 20.

The positive and negative bit pulses produced by drivers 185 and 186 are applied by way of cable 43 to test station 15.

D. Test Station 15

As shown in FIG. 10, test station 15 includes three word straps corresponding to $n-1$, $n$ and $n+1$ words. Plated wire element 20 is inserted between these word straps and a non-plated copper-beryllium wire element 270 is also inserted within these straps and parallel to element 20 to simulate an operational system environment. A connection is made at one end of elements 20 and 270 by mercury contacts 272,3 respectively with these contacts being connected to ground. At the other end of elements 20 and 270, mercury contacts 274,5 respectively are connected to output cable 44. In this manner, the outputs of wires 20 and 270 are applied to the minus and plus inputs of differential amplifier 211 of system 45. This method of differential sensing provides first order cancellation of the bit write transient.

Mercury contact 274 for element 20 is also connected to cable 43 and the three word steps 278 are connected to cable 42. In the manner previously described, predetermined work current pulses are applied to straps 278 and bipolar bit pulses are applied to element 20 with respect to ground.

Test station 15 may be used in any of the modes of operation of test system 12. In one mode of operation, off-line mode, element 20 is a discrete length of planted wire which is to be tested. Element 20 may be driven to position the element to test predetermined regions in response to manual operation by an operator or in accordance with control signals from test system 12. Such an off-line mode of operation and system is described in U.S. patent application, above cited for SYSTEM AND METHOD FOR MAGNETICALLY TESTING PLATED WIRE by James M. Major and assigned to the same assignee as the present invention. In an on-line mode of operation, element 20 comprises a continuous length of plated wire as is supplied directly from the plating process. Testing system 12 operates to perform the tests at a speed compatable with the plating process to determine if the wire being made meets specifications.

E. Response Analysis System 45

Figure 6:
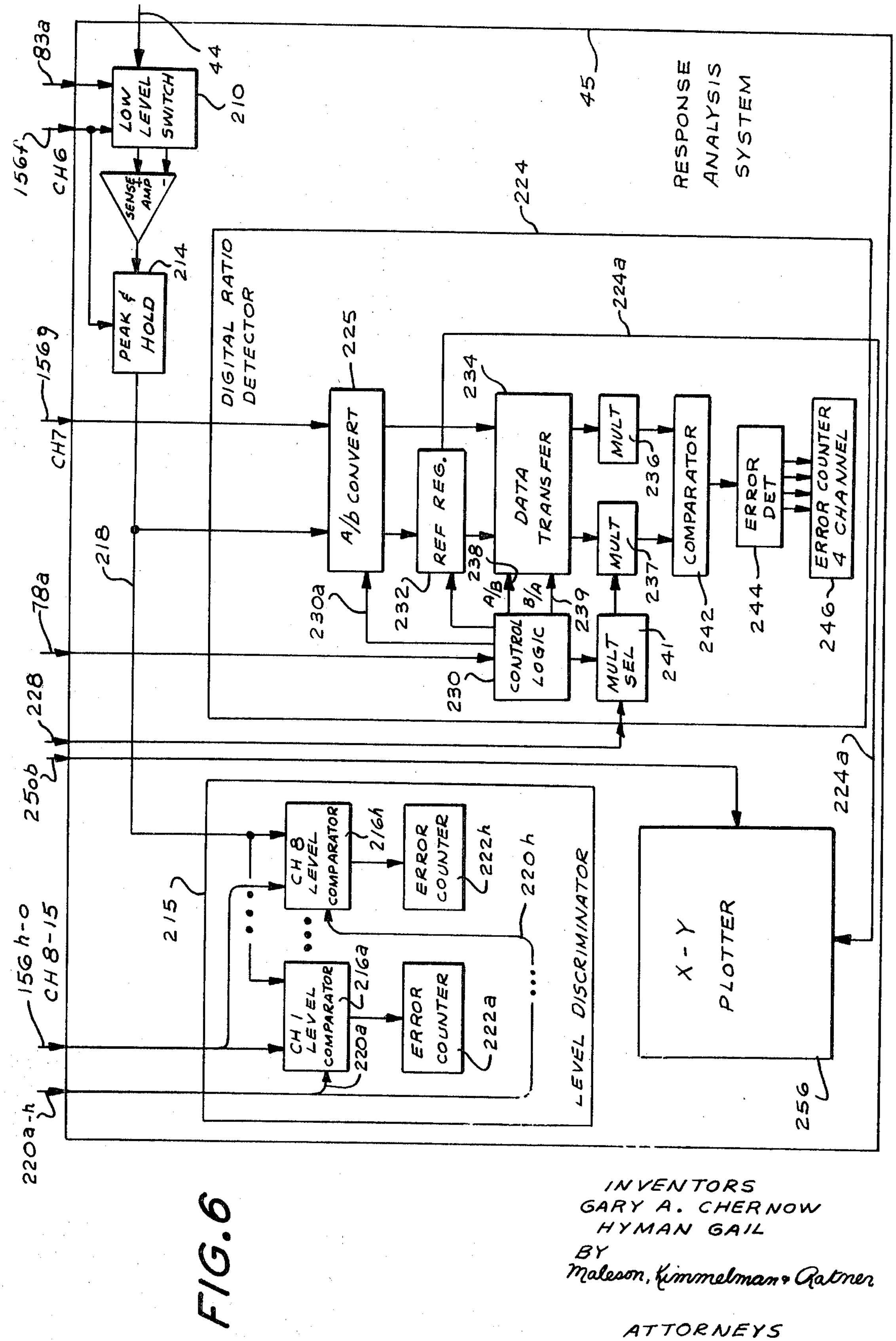
FIG. 6 illustrates in more detail and in block diagram form the response analysis system 45 of FIG. 1D.

The response analysis system 45 shown in detail in FIG. 6, provides two analysis modes, either or both selectable as programmed on boards 26 and 30. A first analysis mode utilizes an eight channel level discriminator 215, of which each channel may be selected to accomplish an analog comparison of the test response signal level and an external reference voltage level. A second analysis mode employs a digital ratio detector 224 to determine whether the digital ratio of successive test signals falls within predetermined threshold percentage value. Each of these response analysis modes is later described in more detail.

In operation, the response signal from plated wire element 20 produced in test station 15 is applied by way of cable 44 to a low level switch 210 which is operated under control of cables 83a and 209. Switch 210 is described in detail in patent application, Ser. No. 838,828 for DIFFERENTIAL SWITCHING SYSTEM FOR SWITCHING LOW LEVEL SIGNALS by D. N. Lee filed July 3, 1969 and assigned to the same assignee as the present invention. Cable 83*a* provides the information stored in analyze select column 83 and cable 156f provides the timing signals on channel CH6 from step timing control 32. Accordingly, switch 210 is turned on only during a read cycle and thereby enabled to pass to sense amplifier 211 only the read response from element 20 and to inhibit the application of high level signals produced during the write cycle which would saturate amplifier 211. The sense signals are voltage amplified by sense differential amplifier 211 and applied to a peak and hold system 214. System 214 is effective to detect the time of the peak of the response signal and to store or hold that analog peak signal voltage level for analysis in either level discriminator 215 or digital ratio detector 224, as programmed in boards 26 and 30.

(1) Level Discriminator 215

The stored peak voltage of the response voltage characteristic is applied to an input of level comparators 216*a–h* of an eight channel discriminator 215. One or more of comparators 216*a–h* may be enabled by an appropriate timing signal on channels CH8–15. The channel timing signals are applied by way of cables 156*h–o* to a respective one of comparators 216*a–h*. Accordingly, one or more of the level comparators 216*a–h* may be enabled when a respective timing signal has been programmed on board 30. With a level comparator enabled, that comparator then is effective to compare the stored response voltage characteristic applied by way of conductor 218 with a predetermined reference voltage level. The reference level is externally set by a reference potentiometer in reference level select 106 for that comparator and applied by respective cables 220*a–h*. Each of the comparators 216*a–h* may be set so that an error state is established when the stored signal 218*a* is greater than the respective reference signal. On the other hand, the comparator may be set so that an error state is established when the stored voltage characteristic is less than the reference level. Alternatively, two of the channels in level discriminator 215 may be ganged together to provide a band of accept levels so that when a stored characteristic falls out of the band, then an error condition is established. Signals generated upon determination of error conditions are applied from comparators 216*a–h* to counters 222 *a*–h for their respective channels to provide a count of errors.

(2) Digital Ratio Detector 224

Digital ratio detector 224 takes the proportional value of a first response or unknown signal with respect to a second response or unknown signal and compares that proportion with a predetermined threshold percentage value. If the proportion of the first signal with respect to the second signal does not exceed the predetermined percentage threshold, then an error condition is produced. A further comparison is taken in which a proportion is taken of the second unknown signal with respect to the first unknown signal and compared with the same percentage value. Similarly, if this proportion does not esceed the predetermined percentage threshold value, then an error is produced. If both first and second comparisons produce no error signal, both comparisons exceed the percentage threshold value and thus, both the first and second unknown signals are within a predetermined tolerance range of each other. The foregoing will now be explained mathematically.

The above described quantities may be defined as follows:

$A$ = value of a first unknown signal, which may be a stored voltage peak or maximum amplitude characteristic 218*a*

$B$ = value of a second unknown signal, which may be another stored voltage peak characteristic 218a $K$ = predetermined percentage threshold $K/100$ = predetermined percentage threshold, expressed as a rational number The expression for the desired comparison is (1) $A/B > K/100$ or, alternatively (2) $100A > KB$.

If the values of A and B are such that equation (2) is satisfied for a particular value of $K$, then there is no error condition produced. In an example, it may be assumed that the first comparison to be made is that the value of voltage signal A must exceed 70 percent of the value of signal $B$. In this example, $K = 70$. Then, equation (2) becomes (3) $100A > 70B$.

Thus, for example, if $A$ = 8 mv. and $B$ = 10 mv., equation (3) for this example is satisfied and there exists no error condition. In the second comparison operation for the example, equation (2) becomes (4) $100B>70A$.

Continuing with the above example with $A$=8 mv. and $B$=10 mv., equation (4) is also satisfied and therefore with both equations (3) and (4) satisfied, there is no error condition for the digital ratio detection.

As a second example which shows a case in which there is an error condition, $A$=6 mv. and $B$=10 mv. Using these values and the same percentage $K$=70 as in equations (3) and (4), it will be seen that although equation (4) is satisfied, equation (3) is not satisfied and therefore an error condition is produced.

It will now be understood that with two unknown values, a comparison of a first value with respect to a second value and then a second value with respect to a first value may be taken to produce a test to determine if the two signals are within a given tolerance range with respect to each other even though the absolute values of the individual signals remains unconstrained. The digital ratio detector test allows the foregoing comparison by multiplying both unknown signals and comparing the two products with respect to the same scale factors. This is to be distinguished from prior detection systems which performed the ratio comparison operation using analog techniques.

In operation of detector 224, stored voltage characteristic 218*a* on conductor 218 is applied to analog-to-digital converter 225 of detector 224 which converts the analog characteristic 218*a* to a binary coded number. Converter 225 operates on command from a timing signal on channel CH7 applied by way of cable 156*g* in accordance with program information on board 30. In addition, segment information by way of cable 78*a* from digital ratio select columns 78 is effective by way of control logic 230 to apply a control signal by way of line 230a to converter 225 thereby to determine the operation to be performed on the converted signal.

Accordingly, with no diode inserted in columns 78 of the segment being operated on, the binary coded value from converter 225 is applied to and stored in a reference register 232. On the other hand, if a diode is inserted in one of columns 78 in the segment being operated on, then the digital value is applied to data transfer 234. At this time, there is no input to reference register 232. Thus, in performing ratio detection, there is a comparison of successive test response voltage characteristics and a first segment of board 26 is used in loading reference register 232 and a second segment is used to provide a comparison signal. It will be further understood that the two segments required for a digital ratio analysis may occur one after the other or may be separated by one or more other segments in an operational test routine.

During the operation of the second segment in a program, after the reference register 232 has been loaded in the first segment, the stored value in register 232 is transferred under control of control logic 230 and by way of A/B transfer cable 238 and data transfer 234 to a multiplier 236 which provides a fixed multiplication operation of the reference value stored in register 232 times 100. Control logic 230 is also effective by way of cable 238 to transfer the comparison signal from converter 225 through transfer 234 to multiplier 237. Multiplier 237 provides a multiplication operation of the value of the comparison signal times a multiplier as selected by multiplier select 241 under control of control logic 230 and precentage select cable 228. The selected multiplier may be one of four externally set values applied to detector 224 by cable 228 from percentage select 76. The multiplier may be selected in accordance with data programmed in column 78 of the segment being operated on.

The product of the multiplication operation performed by multipliers 236,7 are applied to a comparator 242. Comparator 242 is effective to compare the product produced by multiplier 237 with respect to the product produced by multiplier 236. Since in the foregoing operation the product produced by multiplier 236. Since in the foregoing operation the product produced by multiplier 237 is the comparison product, then comparator 242 compares this comparison product with respect to the reference product. Error detection 244 is set to establish an error condition if the comparison product exceeds the reference product and, therefore, the proportion is outside a selected percentage range as determined by column 78 in conjunction with other said devices. The foregoing error detection is accomplished by error detector 244 which provides an error signal to the appropriate channel error counter 246 which counts the errors occurring in the channel determined by control logic 230.

There has now been explained how the comparison signal is compared with respect to the reference signal. As previously described, it is also desired to compare the reference signal with respect to the comparison signal. This is accomplished under the control of control logic 230 which applies a control signal by way of B/A transfer cable 239 to transfer the stored characteristic of the reference in register 232 to multiplier 237. In addition, control logic 230 provides control signals by way of cables 230*a* and 239 to transfer the comparison signal from converter 255 through transfer 234 to multiplier 236. With the comparator 242 operating as above described, the reference is then compared with the comparison signal to determine if the signals are within the selected percentage tolerance range and an error is detected in the described manner. As previously described, both of the foregoing comparisons must be made and if either of the comparisons results in an error, then the error is counted by counter 246.

F. Schmoo Operation

The schmoo test may be defined as a repetitive test of a discrete region of plated wire element 20. Accordingly, this test is performed by test system 12 on element 20 in an off-line mode by applying a sequence of monotonic increasing values of word or bit current pulses and measuring the response of element 20 to the sequence. The response may be displayed in the form of a schmoo plot to show the range of current values for which the response exceeds a predetermined threshold. Alternatively, system 12 may determine the range of current values for which the threshold (discriminator 215) is exceeded for a region and may compare this range with a predetermined range used as an acceptance criterion. In this go/no go form of operation, only an accept/reject signal is produced and a schmoo plot is not generated.

As illustrated in FIGS. 1A–D, test routine control 25 includes a mode select 250 which is operable for schmoo testing to either of two positions, viz, schmoo A or schmoo B. In schmoo A, bit pulse amplitude is incremented in the sequence while word pulse amplitude is constant, and in schmoo B, word pulse amplitude is incremented in the sequence while bit pulse amplitude is constant.

Increment programmer 252 comprises two arrays of switches for both the n word and the bit pulse drivers for producing schmoo control signals to determine the range of values of the incremented pulse amplitudes during the schmoo test. In addition, programmer 252 selects the value of the specific increment of each succeeding pulse. Board 26 includes a schmoo column 254 which determines if a schmoo test is to be performed during a particular segment of a test routine.

In operation of system 12, when a segment to be performed is programmed by a diode in schmoo column 254 to perform the schmoo test, then select 250 and programmer 252 control either word sequencer 157 or bit sequencer 158 in word/bit amplitude select 130. For example, in schmoo A mode of select 250, sequencer 157 is effective to inhibit the application to bit driver **132*b* of the normal amplitude values as provided on lines 178, 179. Sequencer 158 substitutes for these values, as a first amplitude control signal, the minimum signal value as programmed in programmer 252. At the completion of the segment operation, the segment is repeated using the next in the sequence of increasing values as programmed in programmer 252. This operation is repeated until the maximum value of the sequence as programmed in programmer 252 has been performed. It will be understood that during the schmoo A mode there is no change provided by sequencer 157 which transfers the normal values of lines 151*a–c* to word drivers 132*a***.

In another example, schmoo B mode may be selected by select 250 and in this mode, sequencer 157 is effective to inhibit the application to word driver **132*a* of the normal amplitude values of 151*a–c*. Instead of these normal values, there is substituted the sequence of increasing values with a differing value for each succeeding segment in the manner previously described for schmoo A. During schmoo B, sequencer 158 transfers amplitude control signals in the normal manner. The bit and word current drivers apply the programmed test signals to the plated wire element in the manner described in the foregoing sections. The response of element 20 for the schmoo test is applied to response analysis system 45 where the test results are plotted in X-Y plotter 256**.

There are two modes of schmoo display or plotting that can be achieved by system 12. A first mode may comprise a plot of a family of curves portraying peak response voltage, E, on the vertical axis versus the incremented bit current, $I_B$, on the horizontal axis. In this test, for each incremented bit current, the peak response value on line 218 is applied to digital ratio detector 224 in order to achieve long term digital storage. This value is transferred by cable **224*a* and converted to an analog level and plotted by X-Y plotter 256 which is operated under control of mode select 250 by way of cable 250*b***.

A typical plot is shown in FIG. 8 for a bit pulse incremented schmoo test at a single region on the plated wire element under test where bit current is incremented from 5 to 90 ma. A family of plots may be achieved by performing this same test at a series of discrete locations along the length of the plated wire element. During a repeat cycle of this test in which the complement of the data is used, the plated wire may be tested for presence of skew and its associated response distortion. If the skew angle is 0°, then the response characteristic plot will be the mirror image of that shown in FIG. 8.

A second mode of schmoo plotting shows the values of bit current, $I_B$, for which the peak response value, E, exceeds a predetermined threshold, E, as a function of displacement along element 20. The test is performed as described above except that X-Y plotter 256 is set to plot on the vertical axis for each of a series of discrete regions (1) a point for the first value of $I_B$ (i.e., minimum value) at which the response E exceeds threshold E and (2) a point for the last value of $I_B$ (i.e., maximum value) at which the response exceeds E. Distance along the plated wire is taken along the horizontal axis.

FIG. 9 shows a typical plot of this test. The reference "-minimum increment limit" represents the starting point at which bit current is incremented. The upper limit "maximum increment limit" is the maximum value of bit current used in the schmoo test sequence. Point A on the plot represents the first value of bit current that produced a peak response output equal to a predetermined and constant value, E. Point B on the plot represents the value of bit current that first produced a sense output that did not meet the criteria of that predetermined constant value, $E_o$, after it was once achieved. The continuous line 270 starting at the minimum increment limit, continuing to the maximum increment then returning to the minimum increment and shifting over a 1-inch segment, represents the path of pen movement in X-Y recorder 256 for a complete schmoo cycle of a given region. The shaded area 272 indicates the region for which the response of plated wire element exceeds $E_o$.

G. Programmed Test Routine Operation

System 12 operates on the programmed test routine as determined by test routine control 25 and step timing control 32. FIGS. 7A–C show as an example, an adjacent word disturb test routine and required programming of test system 12. The program operations are described in detail in 4. Theory of Test of Memory Element. In the example of FIGS. 7A–C, system 12 first determines 0 through 2 as the segments selected for the desired test routine. Then test routine control 25 commences at segment 0 with the first action within segment 0 being to determine if any diodes are programmed on board 26 within recall segment select columns 64. Since in the example of FIG. 7B a diode is within the A1 column of select 64, test system 12 operates on segment A1.

The first action in segment A1 is to generate amplitude select signals to determine the amplitudes of the test pulses to be used during segment operation. Diodes in the +Δ column of word columns **72*b–d* indicate that the corresponding +Δ amplitude is to be selected from programmer 85. Similarly, a diode in the −Δ columns of positive bit column 74*b* and the +Δ column of negative bit column 74*c* indicate that corresponding −Δ and +Δ amplitudes respectively are to be selected from programmer 85**.

There is no diode in the pattern select column 80 for segment A1, therefore, any write command for segment A1 writes a 0. In the next operation within segment A1, step selection control signals are generated to determine from start step 61 and stop step 62 that timing control 32 steps 0 through 2 are to be performed. Counter 84 in control 25 then generates a start step command to control 32 before operating on the selected sequence of steps of control 32. Control 32 determines how many of these steps are to be repeated. Accordingly, step repeat 92 has been set to provide single step repeats of 1,000 for each of steps 0, 1 and 2. Test system 12 then begins performance of the selected steps. The first step in the selected sequence for segment A1 is step 0 which corresponds to program operation no. 1 as shown in FIG. 7A. Accordingly, the diodes in step 0 column have been inserted in channels 1,4 and 5 and are effective to provide the operation no. 1 in which a 0 is written in the $n-1$ word cell and repeated 1,000 times. Step 1 of the selected step sequence of segment A1 corresponds to program operation no. 2 in which the diodes are inserted to write a 0 in the $n+1$ word which is repeated 1,000 times. In the last step in the segment A1 sequence, step 2, the diodes are inserted to provide operation no. 3 in which a 0 is written in word n and repeated 1,000 times.

At the completion of step 2, step control 90 is effective by way of cable **88*a* to counter 84 to generate a stop step command signal to inform control 25** that the required number of steps 0 – 2 have been completed.

System 12 having completed segment A1 then continues on with segment 0. In segment 0, system 12 generates amplitude control signals to select −Δ amplitude for *n* word, in accordance with word column 72*c*. Further, control signals are generated to select −Δ amplitude control signals from positive bit column 74*b* and +Δ amplitude control signals from negative bit column 74*c*. Pattern select column 80 has been set to determine that a 1 is to be written in all write operations for segment 0. A diode in analyze select column 83 is effective to enable analysis system 45 during all read operations of segment 0. Start step column 61 and stop step column 62 indicate that step sequences 4 and 5 shall be operated on during segment 0, and appropriate step select control signals are generated. Counter 84 then commands control 90 to initiate step operations beginning with step 4.

Step 4 corresponds to program operation no. 4 in which a 1 is written in word *n* cell one time. Step 5 corresponds to operation 5 in which data stored in word *n* is read, analyzed and stored. A diode in channel 6 of step 5 is effective to enable switch 210 and peak and hold system 214 of analysis system 245. A diode in channel 7 of step 5 enables digital ratio detector 224. Since in segment 0 there is no diode in digital ratio select column 78, then the stored voltage characteristic on cable 218 is loaded into the reference register 232 and stored. Control 90 then informs counter 84 that step operations have been completed for segment 0.

Counter 84 then advances to segment 1. There are no diodes in recall segment select columns 64 and therefore, no preconditioning segments are recalled. *n*−1 and *n*+1 columns 72*b* and 72*d* are programmed so that the +Δ amplitudes are selected and positive and negative bit columns so that the −Δ and +Δ amplitudes are selected respectively. Pattern select column 80 indicates that all write operations within segment 1 are write 0, the complement of that written during the data write operation described above. The step sequence selected by start and stop step columns 61 and 62 is steps 6, 7. Step timing control 32 is set so that the step pair 6, 7 is repeated 10,000 times. On command from counter 84, system 12 then performs steps 6 and 7 corresponding to program operations 6 and 7 in FIG. 7A. Step 6 entails writing 0 in the *n*−1 word and step 7 writing 0 in the *n*+1 word. The two step sequence is repeated 10,000 times before control 90 informs counter 84 that selected step operations for segment 1 have been completed.

Counter 84 then advances to segment 2 where the −Δ value for the *n* word amplitude is selected, and the analysis system 45 is enabled by the diode in column 83. The diode in the channel 1 column of digital ratio select column 78 is effective to select the predetermined percentage tolerance range to be used during an analysis operation. Start and stop step columns 61 and 62 limit the selected step sequence to step 5, corresponding to program operation 8. On command from counter 84, system 12 performs step 5, reading word *n* and then analyzing in digital ratio detector 224 where the signal characteristic 218*a* is compared with the signal characteristic as stored during program operation 5 during segment 0. If the resultant comparison fails to fall within the predetermined tolerance, then error counter 246 is incremented. At the completion of this above described analysis, control 90 so informs counter 84. This marks the termination of the adjacent word test routine. If pattern select switch 86 was in the "both" position, then the entire programmed operation would be repeated using the complement of the data in the pattern select column 80.

What is claimed is:

1. A method for testing a memory element by applying thereto a test routine with said test routine having at least one programmed segment and with each segment having at least one programmed step, which comprises 1. operating in sequence on said test routine,
2. operating in sequence on the programmed segments in said test routine by
   - a. recalling, when programmed in a segment being operated on, predetermine other segments for prior operation,
   - b. selecting test parameters and steps to be performed as programmed in each segment being operated on, and
3. operating in sequence on the selected steps by
   - a. generating timing signals as programmed in each step being operated on,
   - b. generating test signals as a function of said selected test parameters and in response to said timing signals.

2. The testing method of claim 1 in which there is further provided the steps of producing a start step signal after selecting test parameters and steps to be performed to initiate said operating in sequence on the selected steps, generating a stop step signal at the last of the steps selected to be performed, detecting the stop step signal and sequencing to the next segment in said test routine.

3. A method for testing a plated wire magnetic memory element by applying thereto a selectable sequence of test routines in which each test routine is a programmed sequence of tests and analyses and with each routine having at least one programmed segment and with each segment having at least one programmed step, which comprises 1. selecting at least one of said test routines,
2. operating in sequence on the selected test routine,
3. operating in sequence on the programmed segments in each test routine by
   - a. recalling, if so programmed in a segment being operated on, predetermined segments other than segments in said selected test routine for prior operation,
   - b. selecting test parameters as programmed in each segment being operated on,
   - c. selecting steps to be performed as programmed in each segment being operated on,
   - d. analyzing the resultant response signals of said element under test
4. operating in sequence on the selected steps by
   - a. generating timing signals programmed in each step being operated on,
   - b. generating test signals as a function of said selected test parameters and in response to said timing signals, and
   - c. applying said test signals to the plated wire element under test.

4. The method of claim 3 in which there is further provided after recalling and performing said predetermined other segments returning to said segment being operated on.

5. The method of claim 3 in which said operating in sequence on the programmed segments is performed in an asynchronous manner at an instantaneous rate proportional to the time required to perform the steps programmed in each segment being operated on, and generating said timing signals synchronous with an independent predetermined frequency clock signal.

6. A system for testing a plated wire magnetic memory element by applying thereto a selectable sequence of test routines in which each test routine is a programmed sequence of tests and analyses and with each routine having at least one programmed segment and with each segment having at least one programmed step comprising first means for selecting at least one of said test routines, second means for selecting in sequence the programmed segments to be in selected test routine and responsive to said first selecting means, means for selectively controlling said second selecting means for recalling predetermined segments other than segments in said selected test routine, means connected to said second selecting means for selecting test parameters as programmed in a selected segment in said sequence, means connected to said second selecting means for selecting steps to be performed as programmed in said selected segment, means connected to said step selecting means for performing in sequence said selected steps, first means connected to said step selecting means for generating timing signals as programmed in a selected step in said sequence, second means connected to said test parameter selecting means, said step selecting means, said performing means and said first generating means for generating test signals as a function of said selected test parameters and in response to said timing signals, and means connected to said second generating means for applying said test signals to said plated wire element under test.

7. The system of claim 6 in which there is provided means for analyzing the response signals of said element under test resulting from the application thereto of said test signals.

8. The system of claim 8 in which there is provided means connected to said performing means for generating step selection control signals as programmed in a selected segment in said sequence and said means for selecting steps to be performed being responsive to said step selection control signals.

9. A system for producing a programmed sequence of tests for a magnetic memory element to be tested comprising programmed test control means for producing (1) programmed amplitude and pattern control signals and (2) programmed step selection control signals, programmed step timing control means for (1) selecting steps to be performed in response to said step selection control signals and (2) generating timing signals as programmed in each of said selected steps, test signal generator means, and means for applying said timing signals and said amplitude and pattern control signals to said generator means for generating test signals in accordance with said control and timing signals for performance of said tests.

10. The system of claim 9 in which said step timing control means includes means for repeating at least once the generation of timing signals as programmed in a step.

11. The system of claim 10 in which said repeating means is operable to repeat at least once a selected pair of steps.

12. The system of claim 10 in which said repeating means is operable to repeat at least once a selected group of four steps.

13. The system of claim 9 in which said programmed test control means produces said control signals in an asynchronous manner at an instantaneous rate proportional to the time required to perform said steps, and said programmed step timing control means generates said timing signals synchronous with an independent predetermined frequency clock signal.

14. The system of claim 9 in which said programmed test control means includes means for producing a start step signal for initiating operation of said programmed step timing control means for selecting a first of the steps to be performed.

15. The system of claim 14 in which said programmed step timing control means includes means for generating a stop step signal at the last of the steps selected to be performed and said programmed test control means including means for detecting said stop step signal.

16. A system for testing a plated wire magnetic memory element by applying thereto a selectable sequence of test routines in which each test routine is a programmed sequence of tests and analyses and with each routine having at least one programmed segment and with each segment having at least one programmed step comprising means for selecting at least one of said test routines, test routine means for selecting in sequence the programmed segments to be in a selected test routine, programmed test control means coupled to said test routine means for producing at a selected programmed segment an instantaneous rate proportional to the time required to perform programmed steps (1) test parameter control signals as programmed in a selected segment and (2) programmed step selection control signals as programmed in said segment, programmed step timing control means for (1) selecting steps to be performed in said segment in response to said step selection control signals and (2) generating timing signals synchronous with a predetermined clock signal as programmed in each of said selected steps, test signal generator means, and means coupled to said programmed test control means and said programmed step timing control means for applying said timing signals and said test parameter signals to said generator means for generating test signals in accordance with said timing and test parameter signals for performance of said tests and analyses.

17. The testing system of claim 16 in which said programmed test control means includes means for recalling predetermined segments other than segments in said selected test routine.

18. The testing system of claim 17 in which said recall means provides for returning to said segment in said selected test routine after recalling and performing said predetermined other segments.

19. The testing system of claim 18 in which each of said programmed test control means and said programmed step timing control means comprises a programmable diode matrix pin board.

20. The system of claim 16 in which said programmed test control means includes means coupled to said programmed step timing control means for producing a start step signal for initiating operation of said programmed step timing control means for selecting a first of the steps to be performed.

21. The system of claim 20 in which said programmed step timing control means includes means for generating a stop step signal at the last of the steps selected by said step selection control signals, said programmed test control means including means connected to said programmed step timing control means for detecting said stop step signal and for sequencing to the next segment in said test routine.

22. A method for testing a magnetic memory element by applying thereto a selectable sequence of test routines with each test routine having at least one programmed segment and with each segment having at least one programmed step, which comprises 1. selecting at least one of said test routines and operating in sequence on the selected test routine,
2. operating in sequence on the programmed segments in each test routine by producing
   a. programmed amplitude and patter control signals and
   b. programmed step selection control signals
3. operating in sequence on the selected steps by
   a. selecting steps to be performed in response to said step selection control signals and
   b. generating timing signals as programmed in each of said selected steps, and
4. generating test signals as a function of said timing signals and said amplitude and pattern control signals, and
5. applying said test signals to said magnetic memory element.

23. The method of claim 22 in which said producing programmed amplitude and pattern control signals and programmed step selection control signals is in an asynchronous manner at an instantaneous rate proportional to the time required to perform said steps.

24. The method of claim 23 in which said generating said timing signals is synchronous with an independent predetermined frequency clock signal.

25. The method of claim 22 in which there is provided recalling, when programmed in a segment being operated on, predetermined segments other than said segments in said selected test routine for prior operation.

26. The method of claim 25 in which there is provided, after recalling and performing said predetermined other segments, returning to said segment being operated on.

27. The method of claim 22 in which there is provided, repeating at least once, generating timing signals as programmed in a step.

28. The method of claim 27 in which there is provided, repeating at least once, a selected pair of steps.

29. The method of claim 27 in which there is provided, repeating at least once, a selected group of four steps.

30. A system for producing a programmed sequence of tests and analyses for a magnetic memory element to be tested comprising programmed means for generating in accordance with a programmed sequence of tests (1) amplitude select signals, (2) amplitude value signals and (3) pattern select signals, pattern control means responsive to said pattern select signals for producing pattern control signals, amplitude transfer means for transferring said amplitude value signals and responsive to said pattern control means, gating selection means connected to an output of said transfer means and said programmed means for producing amplitude control signals in accordance with said amplitude select signals and amplitude value signals, programmed timing control means for generating timing signals, and current pulse generator means responsive to said amplitude control signals, said pattern control signals and said timing signals for producing test signals in accordance with said programmed sequence of tests.

31. The system of claim 30 in which said programmed means generates an amplitude value signal corresponding to each of a predetermined maximum, nominal and minimum tolerance value, said gating selection means comprises maximum, nominal and minimum tolerance value gating means only one of which is enabled at one time by said amplitude select signals.

32. The system of claim 30 in which said current pulse generator means includes a first and a second pair of delay means, each pair operable for providing a predetermined first or second delay, pulse routing means responsive to said pattern control and timing signals to apply said timing signals to one of each pair of said first and second pair of delay means, first and second generator means connected to said first and second pair of delay means respectively for generating a positive and a negative pulse respectively in response to the application of a delayed timing signal, and summing means for producing a bipolar test signal from said signals produced by said first and second generator means.

33. The system of claim 31 in which said current pulse generator means includes an attenuator switchable in accordance with said amplitude control signals for controlling the amplitude of said test signals.

34. The system of claim 31 in which said current pulse generator means includes means for producing a predetermined constant rise and fall time pulse signal of a constant amplitude in response to said timing and pattern control signals, an attenuator switchable in accordance with said amplitude control signals for attenuating said pulse signal for producing a resultant test signal of predetermined and constant rise and fall time which is independent of amplitude of said test signal.

35. The system of claim 31 in which said amplitude transfer means is responsive to said pattern control signals for (1) directly transferring during a first state said amplitude value signals from said programmed means directly to a respective tolerance value gating means and (2) transferring during a second state (a) the maximum tolerance amplitude value signal from said programmed means to said minimum tolerance value gating means input and (b) the minimum tolerance amplitude value signal from said programmed means to said maximum tolerance value gating means input of said selection means whereby worst case amplitude control signals are generated for both a programmed pattern and its complement.

36. The system of claim 30 in which said current pulse generating means includes width control means operable for generating either a first or second predetermined width test signal and pulse routing means responsive to said pattern control signals and timing signals for operating said width control means to generate said first or second test signals thereby providing worst case test signals for both a programmed pattern and its complement.

37. A system for testing a magnetic memory element by applying a programmed sequence of increasing values of test current pulses and measuring the response of said element to the test comprising programmed test control means for producing (1) programmed amplitude and pattern control signals, (2) programmed schmoo control and amplitude value signals and (3) programmed step selection control signals, programmed step timing control means for (1) selecting steps to be performed in response to said step selection control signals and (2) repeating steps in response to said schmoo control signals and (3) generating timing signals as programmed in each of said selected steps, and test signal generator means having applied thereto said timing signals and said amplitude and pattern control signals for generating test signals, said generator means including sequencer means having said schmoo control signals applied thereto for performing steps in sequence with increasing values of test current pulses.

38. The system of claim 37 in which said sequencer means comprises a word amplitude sequencer and a bit amplitude sequencer responsive to said schmoo control signals for sequencing during successive steps with increasing programmed schmoo amplitude values either (1) word current pulses with a constant bit current pulse or (2) bit current pulses with a constant word current pulse.

39. The system of claim 37 in which there is provided means for applying said sequence of increasing values of test current pulses to discrete portions of said memory element, means for analyzing each of said portions and detecting the values of test current pulses for which the peak value of the response exceeds a predetermined threshold value, and display means for displaying the range of current pulse values for which said peak value of response exceeds said predetermined threshold value.

40. A method for testing memory elements by applying thereto a sequence of test signals and comparing a first response signal value of an element with a second response signal value of an element to determine whether said response signal values are within a predetermined threshold percentage value of each other which comprises determining a first ratio said first response signal value with respect to said second response signal value, comparing the value of said first ratio with said predetermined threshold percentage value and producing a first error signal if said first ratio value is less than said threshold value, determining as a second ratio said second response signal value with respect to said first response signal value, comparing the value of said second ratio with said threshold value and producing a second error signal if said second ratio value is less than said threshold value whereby said first and said second response signal values are within said predetermined threshold percentage value of each other if no error signal is produced.

41. The method of claim 40 in which said determining and comparing of said first ratio steps are provided by the steps of multiplying said first response signal value times said threshold value to produce a first product, multiplying said second response signal value times a constant multiplier to produce a second product, comparing said first and second products to produce said first error signal if said first product is of greater magnitude than said second product.

42. The method of claim 41 in which said determining and comparing of said second ratio steps are provided by the steps of multiplying said second response signal value times said threshold value to produce a third product, multiplying said first response signal value times a constant multiplier to produce a fourth product, comparing said third and fourth products to produce said second error signal if said third product is of greater magnitude than said fourth product.

43. A system for testing a magnetic memory element by applying to regions of the element a sequence of test signals and comparing the value of a first response signal of a region with the value of a second response signal of another region to determine whether said response signal values are within a predetermined threshold percentage value of each other, means for storing said first response signal, first and second multiplier means, means for generating a signal value proportional to a constant multiplier, means for applying (1) said stored first response signal and a signal proportional to said threshold value to said first multiplier means for producing a first product signal, and (2) said second response signal and said constant multiplier signal to said second multiplier means to produce a second product signal, comparing means connected to said first and second multiplier means for comparing said first and second product signals to produce a first error signal if said first product signal is of greater magnitude than said second product signal, means for applying (1) said second response signal and said threshold value signal to said first multiplier means for producing a third product signal and (2) said stored first response signal and said constant multiplier signal to said second multiplier means to produce a fourth product signal, said comparing means comparing said third and fourth products to produce a second error signal if said third product signal is of greater magnitude than said fourth product signal whereby said values of said first and second response signals are within said predetermined threshold percentage value of each other if no error signal is produced.

44. The system of claim 43 in where there is provided an analog to digital converter for converting first and second response signals from analog form to digital form prior to application to said storage means and applying means in which said first and second multiplier means are digital multipliers.

45. A method for testing a first and second region of a plated wire magnetic memory element by applying thereto a test routine with said test routine having at least one programmed segment and with each segment having at least one programmed step, which comprises 1. operating in sequence on said test routine,
2. operating in sequence on the programmed segments in said test routine by
   a. recalling when programmed in a segment being operated on, predetermined other segments for prior operation,
   b. selecting test parameters and steps to be performed as programmed in each segment being operated on, and
2. operating in sequence on the selected steps by
   a. generating timing signals as programmed in each step being operated on,
   b. generating test signals as a function of said selected test parameters and in response to said timing signals,
   c. applying said test signals to the plated wire regions under test, and
4. analyzing the resultant first response signal value of said first region with a second response signal value of said second region to determine whether said response signal values are within a predetermined threshold percentage value of each other by
   a. determining a first ratio said first response signal value with respect to said second response signal value,
   b. comparing the value of said first ratio with said predetermined threshold percentage value and producing a first error signal if said first ratio value is less than said threshold value,
   c. determining as a second ratio said second response signal value with respect to said first response signal value,
   d. comparing the value of said second ratio with said threshold value and producing a second error signal if said second ratio value is less than said threshold value whereby said first and said second response signal values are within said predetermined threshold percentage value of each other if no error signal is produced.

* * * * *